(12) United States Patent
Szalai et al.

(10) Patent No.: US 11,851,053 B2
(45) Date of Patent: Dec. 26, 2023

(54) COLLABORATIVE ACCIDENT PREVENTION

(71) Applicant: International Business Machines Corporation, Armonk, NY (US)

(72) Inventors: Zsolt Szalai, Tourrettes-sur-Loup (FR); Frederic Bauchot, Saint-Jeannet (FR); Joel Viale, Vence (FR)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 17/020,224

(22) Filed: Sep. 14, 2020

(65) Prior Publication Data
US 2022/0080959 A1   Mar. 17, 2022

(51) Int. Cl.
*B60W 30/095* (2012.01)
*G08G 1/09* (2006.01)
(Continued)

(52) U.S. Cl.
CPC .... *B60W 30/0956* (2013.01); *B60W 30/0953* (2013.01); *G01C 21/3492* (2013.01);
(Continued)

(58) Field of Classification Search
CPC .......... G08G 1/166; G08G 1/163; G08G 1/22; G08G 1/164; G08G 1/096791; G08G 1/161; G08G 1/162; G08G 1/0112; G08G 1/096725; G08G 1/096741; G08G 1/167; G08G 1/0129; G08G 1/0145; G08G 1/015; G08G 1/017; G08G 1/07; G08G 1/09;
(Continued)

(56) References Cited

U.S. PATENT DOCUMENTS 8,718,908 B2   5/2014   Kumabe
8,855,835 B2   10/2014  Kumabe
(Continued)

FOREIGN PATENT DOCUMENTS

CN   102157072 B   3/2013
CN   108597251 A   9/2018

OTHER PUBLICATIONS

Fortelle et al., "Autonomous Driving at Intersections: Combining Theoretical Analysis With Practical Considerations". ITS World Congress 2015, ERTICO—ITS Europe, Oct. 2015, 2 Pages, <https://hal-mines-paristech.archives-ouvertes.fr/hal-01217925v2>.
(Continued)

*Primary Examiner* — Maceeh Anwari
*Assistant Examiner* — Aarron E Santos
(74) *Attorney, Agent, or Firm* — Michael A. Petrocelli

(57) ABSTRACT

In an approach to collaborative accident prevention, that a first vehicle is approaching an intersection is detected. A first vehicle information vector is broadcast from the first vehicle, where the first vehicle information vector contains at least a first vehicle speed, a first vehicle position, and a first vehicle direction. Responsive to receiving a second vehicle information vector from a second vehicle, an optimal order to cross the intersection is calculated based on the first vehicle information vector and the second vehicle information vector. A first adjusted vehicle speed is signaled to the first vehicle and a second adjusted vehicle speed is signaled to the second vehicle based on the optimal order to cross the intersection.

25 Claims, 10 Drawing Sheets

(51) Int. Cl.
*H04W 4/46* (2018.01)
*G01C 21/34* (2006.01)
*G08G 1/081* (2006.01)
*G06V 20/56* (2022.01)

(52) U.S. Cl.
CPC .......... *G06V 20/588* (2022.01); *G08G 1/081* (2013.01); *G08G 1/091* (2013.01); *H04W 4/46* (2018.02)

(58) Field of Classification Search
CPC ...... G08G 1/0965; G08G 1/16; G01S 13/931; G01S 19/17; G01S 19/34; G01S 19/52; G01S 2013/9316; G01S 2013/93185; G01S 2013/932; G01S 2013/93271; G01S 2013/93273; G01S 2013/9329; H04W 4/024; H04W 4/029; H04W 4/46; H04W 52/0241; G05D 2201/0213; G05D 1/024; G05D 1/0278; G05D 1/0257; G05D 1/0055; G05D 1/0088; G05D 1/0212; G05D 1/0246; G05D 1/0253; G05D 1/0293; G05D 1/0295; B60W 2556/65; B60W 30/09; B60W 10/04; B60W 10/20; B60W 2050/143; B60W 30/18154; B60W 50/14; B60W 10/18; B60W 2552/00; B60W 2554/801; B60W 2554/804; B60W 2555/20; B60W 2556/50; B60W 2556/55; B60W 2710/18; B60W 2710/20; B60W 2720/10; B60W 30/0953; B60W 60/0015; B60W 10/184; B60W 2520/10; B60W 2520/105; B60W 2554/00; B60W 2554/402; B60W 2554/4041; B60W 2554/4042; B60W 2554/4045; B60W 2554/4046; B60W 2554/80; B60W 2720/103; B60W 2754/10; B60W 2756/10; B60W 30/00; B60W 30/095; B60W 30/0956; B60W 30/18163; B60W 40/04; B60W 40/08; B60W 50/0097; B60W 60/0011; B60W 60/0027; B60W 60/00274; B60W 30/165; G06V 20/56; G06V 10/25; G06V 20/58; G06V 20/584; G06V 40/161

See application file for complete search history.

(56) References Cited

U.S. PATENT DOCUMENTS

| | | | |
|---|---|---|---|
| 9,126,609 | B2 | 9/2015 | Steffen |
| 9,349,291 | B2 | 5/2016 | Goudy |
| 10,304,333 | B2 | 5/2019 | Engel |
| 10,621,869 | B2 | 4/2020 | Yamamoto |
| 2002/0036584 | A1* | 3/2002 | Jocoy .................... G01S 13/931 342/72 |
| 2012/0095646 | A1 | 4/2012 | Ghazarian |
| 2014/0172265 | A1 | 6/2014 | Funabashi |
| 2016/0163200 | A1 | 6/2016 | He |
| 2017/0057514 | A1 | 3/2017 | Toyoda |
| 2017/0131719 | A1 | 5/2017 | Micks |
| 2017/0151944 | A1* | 6/2017 | Al-Stouhi .............. G08G 1/166 |
| 2017/0186327 | A1* | 6/2017 | Uysal ..................... G08G 1/161 |
| 2019/0051158 | A1* | 2/2019 | Felip Leon .......... G08G 1/0116 |
| 2019/0088135 | A1 | 3/2019 | Do |
| 2020/0342760 | A1* | 10/2020 | Vassilovski ............. H04W 4/06 |
| 2020/0372793 | A1* | 11/2020 | Weizman ................ G08G 1/015 |
| 2022/0084405 | A1* | 3/2022 | Zhang ............ B60W 30/18159 |

OTHER PUBLICATIONS

Masi et al., "Adapting the Virtual Platooning Concept to Roundabout Crossing", 2018 IEEE Intelligent Vehicles Symposium (IV), Changshu, Suzhou, China, Jun. 26-30, 2018, 7 Pages.

Shi et al., "A 5G-V2X Based Collaborative Motion Planning for Autonomous Industrial Vehicles at Road Intersections", © 2018 IEEE, DOI 10.1109/SMC.2018.00634, 5 Pages.

* cited by examiner

COLLABORATIVE ACCIDENT PREVENTION

BACKGROUND

The present invention relates generally to the field of traffic control systems for road vehicles, and more particularly to collaborative accident prevention.

A traffic accident is classified as any accident involving motor vehicles, which results in an event that is considered to be in contrast of expected, intended, or routine operation. A traffic collision, also called a motor vehicle collision, car accident, or car crash, occurs when a vehicle collides with another vehicle, pedestrian, animal, road debris, or other stationary obstruction, such as a tree, utility or sign pole, or building.

An intersection consists of two or more roadways that intersect at the same level. The three basic types of intersections are the three-leg or T-intersection (with variations in the angle of approach), the four-leg intersection, and the multi-leg intersection. Each intersection can vary greatly in scope, shape, use of channelization and other types of traffic control devices.

SUMMARY

Embodiments of the present invention disclose a method, a computer program product, and a system for collaborative accident prevention. In one embodiment, that a first vehicle is approaching an intersection is detected. A first vehicle information vector is broadcast from the first vehicle, where the first vehicle information vector contains at least a first vehicle speed, a first vehicle position, and a first vehicle direction. Responsive to receiving a second vehicle information vector from a second vehicle, an optimal order to cross the intersection is calculated based on the first vehicle information vector and the second vehicle information vector. A first adjusted vehicle speed is signaled to the first vehicle and a second adjusted vehicle speed is signaled to the second vehicle based on the optimal order to cross the intersection.

In one embodiment, that a first vehicle is approaching an intersection is detected. A first vehicle information vector is broadcast from the first vehicle, where the first vehicle information vector contains at least a first vehicle speed, a first vehicle position, and a first vehicle direction. Responsive to receiving a second vehicle information vector from a second vehicle, whether the first vehicle direction equals the second vehicle direction is determined. Responsive to determining that the first vehicle direction equals the second vehicle direction, whether the distance between the first vehicle and the second vehicle is less than a threshold is determined. Responsive to determining that the distance between the first vehicle and the second vehicle is less than the threshold, the first vehicle and the second vehicle are added to a convoy. The first convoy vehicle is determined, where the first convoy vehicle is the front vehicle of the plurality of convoy vehicles. A convoy information vector is broadcast.

DETAILED DESCRIPTION

Figure 1:
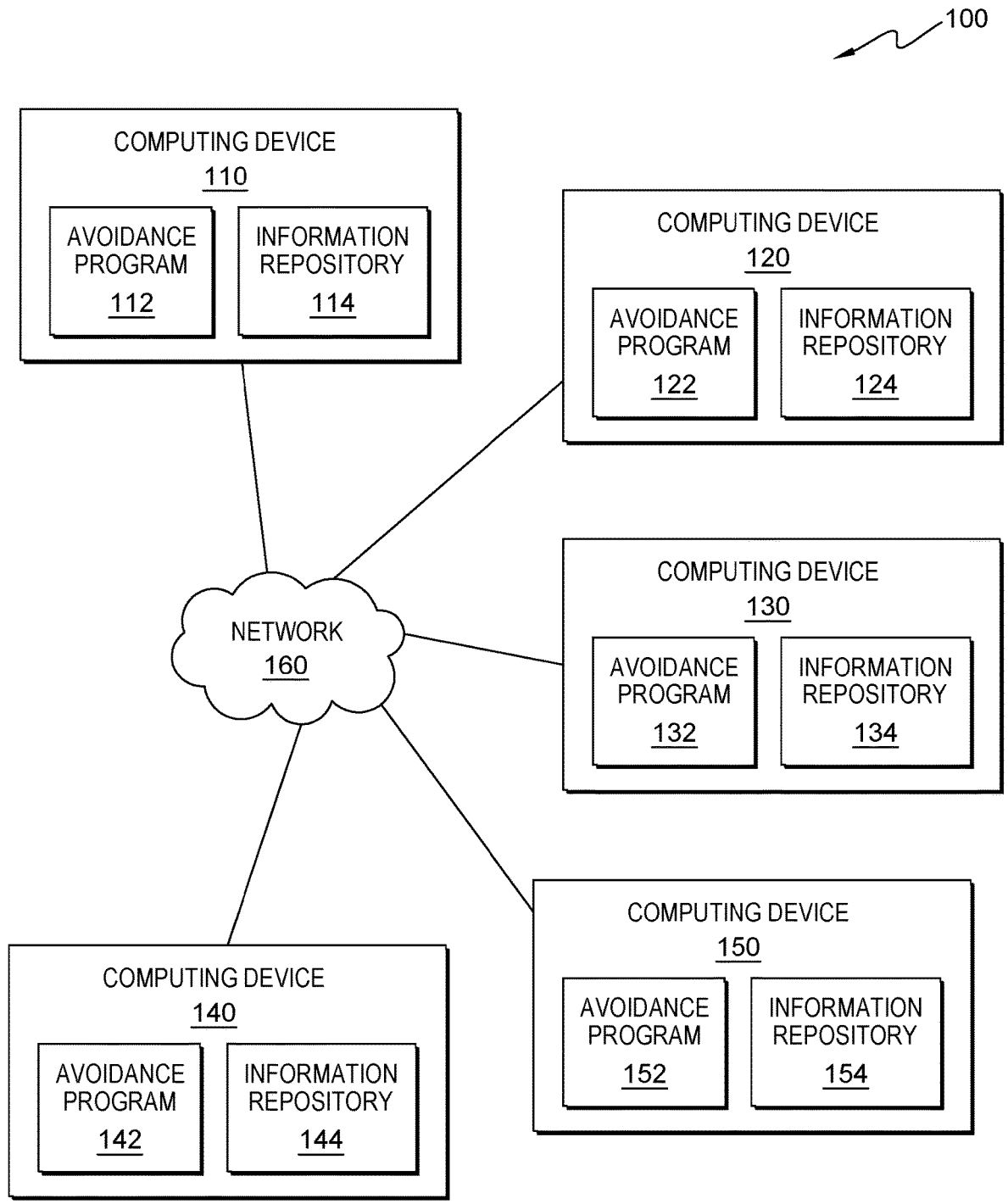
FIG. 1 is a functional block diagram illustrating a distributed data processing environment, in accordance with an embodiment of the present invention.

Vehicle accidents occur for many reasons, and nearly half of all accidents occur at intersections. Accidents often occur at intersections because these are the locations where two or more roads cross each other and activities such as turning left, crossing over, and turning right have the potential for conflicts resulting in accidents. Even though intersections constitute only a small proportion of the entire roadway system, a significantly large proportion of accidents occur at intersections. According to government statistics there are approximately 2.5 million intersection accidents annually in the United States. By some accounts, over forty percent of all traffic accidents, fifty percent of serious accidents, and over 20 percent of fatal accidents involve intersections. With nearly a quarter of traffic deaths and approximately half of traffic injuries occurring at intersection, a big part of tackling road safety challenges involves intersections. Many strategies include geometric design and traffic control devices such as signals, signs, and markings. A combination of these different strategies is required to solve the issue.

One of the leading causes of traffic accidents at intersections is a misjudgment of the gap or of the speed of the other vehicle. At intersections with no traffic control devices, this is a leading cause of traffic accidents. Driver recognition error (i.e., inattention, internal and external distractions, etc.) and driver decision error (i.e., false assumption of actions by another driver, misjudgment of gap or speed of another vehicle) account for the vast majority of traffic accidents at intersections.

In addition to traffic accidents, intersections can lead to inefficiencies that result in wasted time and energy when a vehicle waits at a controlled intersection while no other vehicles are present. Existing intersection management solutions are not optimal. For example, a crossroad may remain empty while vehicles are stacking up on a red signal in one direction while there are no vehicles crossing the intersection in the direction having the green signal. Even with traffic lights equipped with vehicle presence detection systems, vehicles would typically need to stop and wait for the signal to cycle over to green. With stop signs, vehicles need to stop even if there is no other vehicle approaching the intersection to yield to. In addition, risks do remain at controlled intersections. A green traffic light does not give full guarantee; for example, an emergency vehicle would have the right of way, and an inattentive driver might not notice the approaching emergency vehicle, potentially leading to a traffic accident, as well as delaying the response of the emergency vehicle to the emergency. Likewise, stop signs leave room for human interpretation, hence for human errors.

The present invention allows vehicles arriving near a crossroads to exchange information (static and dynamic) to determine any necessary speed variations and to choose the order in which the vehicles cross the intersection to avoid a collision. The present invention bases this determination on multi-criteria optimization. The criteria identified may include, for example, the vehicle priority (e.g., emergency vehicles come before private cars); the energy consumption (i.e., the total energy of all the vehicles crossing the intersection must be minimized); the carbon footprint (the total carbon footprint of all the vehicles crossing the intersection must be minimized); and temporal constraints or the traffic flow aspect (i.e., the crossing must be cleared as quickly as possible). In various embodiments of the invention, other criteria may be elected, and new criteria may become attractive or possible as technology and society priorities evolve.

The advantages provided by the present invention address different traffic attributes. The first attribute is safety; the system determines unambiguous crossing information. Another attribute is priority; in some embodiments the present invention introduces a priority scale, with, for example, emergency vehicles (e.g. ambulance, firefighters, police) at the very top. In some embodiments, priority is governed by fairness; for example, the base rule may be first in, first out, which is adjusted for specific criteria, such as energy saving or non-polluting vehicles may be encouraged by giving such vehicles a higher priority than ordinary vehicles. In another embodiment, the criteria is the transit time aimed at streamlining the traffic. Another attribute is traffic fluidity, which adds multiple benefits to the primary objective of better safety, which include less pollution, travel time gains, and calmer drivers.

It should be noted that the term "crossroads" as used in this specification is used in a generic way, addressing all the different types of road intersections, such as X-shaped, Y-shaped, multi-way, etc.

As referred to herein, all data retrieved, collected, and used, is used in an opt in manner, i.e., the data provider has given permission for the data to be used. For example, the installation procedure for a computing device, such as a smart phone, that would be used to collect data could include an option that must be selected by the owner to allow use of the data. As another example, the avoidance program could request approval from the owner of the device before collecting the data. Any data or information used for which the provider has not opted in is data that is publicly available FIG. 1 is a functional block diagram illustrating a distributed data processing environment, generally designated 100, suitable for operation of avoidance program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing devices 110, 120, 130, 140, and 150, all connected to network 160. In some embodiments, network 160 is a peer-to-peer network. Network 160 may be, for example, Bluetooth, ZigBee, infrared transmission, or dedicated short-range communication (DSRC). In another embodiment, computing devices 110, 120, 130, 140, and 150 may communicate with each other using any peer-to-peer network as would be known to a person having skill in the art.

In some embodiments, network 160 is a network that allows communication between any number of computing devices, and will allow access by any of the devices or programs running on the devices to any required network such as an ad-hoc or peer-to-peer network as described above, infrastructure-based network, or the internet. Network 160 can be, for example, a dedicated communications network, a cellular network, or a wireless Ethernet network. In an embodiment, network 160 can include one or more wireless networks that are capable of receiving and transmitting data, voice, and/or video signals, including multimedia signals that include voice, data, and video information. In general, network 160 can be any combination of connections and protocols that will support communications between computing devices 110, 120, 130, 140, and 150 and other computing devices (not shown) within distributed data processing environment 100.

Computing devices 110, 120, 130, 140, and 150 can each be a standalone computing device, a mobile computing device, or any other electronic device or computing system capable of receiving, sending, and processing data from within a vehicle. In an embodiment, computing devices 110, 120, 130, 140, and 150 can each be a laptop computer, a tablet computer, a netbook computer, a smart phone, a computing device integrated into a vehicle, or any programmable electronic device capable of communicating with other computing devices (not shown) within distributed data processing environment 100.

In an embodiment, computing devices 110, 120, 130, 140, and 150 each includes avoidance program 112, 122, 132, 142, and 152, respectively. In an embodiment, avoidance program 112, 122, 132, 142, and 152 is a program, application, or subprogram of a larger program for collaborative accident prevention. Reference may be made to avoidance program 112 and all references apply to avoidance program 122, 132, 142, and 152 as well.

In an embodiment, computing devices 110, 120, 130, 140, and 150 include information repository 114, 124, 134, 144, and 154, respectively. In an embodiment, information repository 114, 124, 134, 144, and 154 may be managed by avoidance program 112. In an alternate embodiment, information repository 114, 124, 134, 144, and 154 may be managed by the operating system of the device, alone, or together with, avoidance program 112. Information repository 114, 124, 134, 144, and 154 are data repositories that can store, gather, compare, and/or combine information. In some embodiments, information repository 114, 124, 134, 144, and 154 are located externally to computing devices 110, 120, 130, 140, and 150, respectively, and accessed through a communication network, such as network 160. In some embodiments, information repository 114, 124, 134, 144, and 154 are stored on computing devices 110, 120, 130, 140, and 150, respectively. In some embodiments, information repository 114, 124, 134, 144, and 154 may reside on another computing device (not shown), provided that information repository 114, 124, 134, 144, and 154 are accessible by computing devices 110, 120, 130, 140, and 150, respectively. Information repository 114, 124, 134, 144, and 154 include, but are not limited to, position data, map data, vehicle data, route data, intersection data, time data, priority data in form of position of a vehicle on a priority scale, energy consumption data, carbon footprint data, vehicle dynamic data, user data, system configuration data, and other data that is received by avoidance program 112 from one or more sources, and data that is created by avoidance program 112.

Information repository 114, 124, 134, 144, and 154 may each be implemented using any volatile or non-volatile storage media for storing information, as known in the art. For example, information repository 114, 124, 134, 144, and 154 may each be implemented with a tape library, optical library, one or more independent hard disk drives, multiple hard disk drives in a redundant array of independent disks (RAID), solid-state drives (SSD), or random-access memory (RAM). Similarly, the information repository 114, 124, 134, 144, and 154 may each be implemented with any suitable storage architecture known in the art, such as a relational database, an object-oriented database, or one or more tables.

Figure 2:
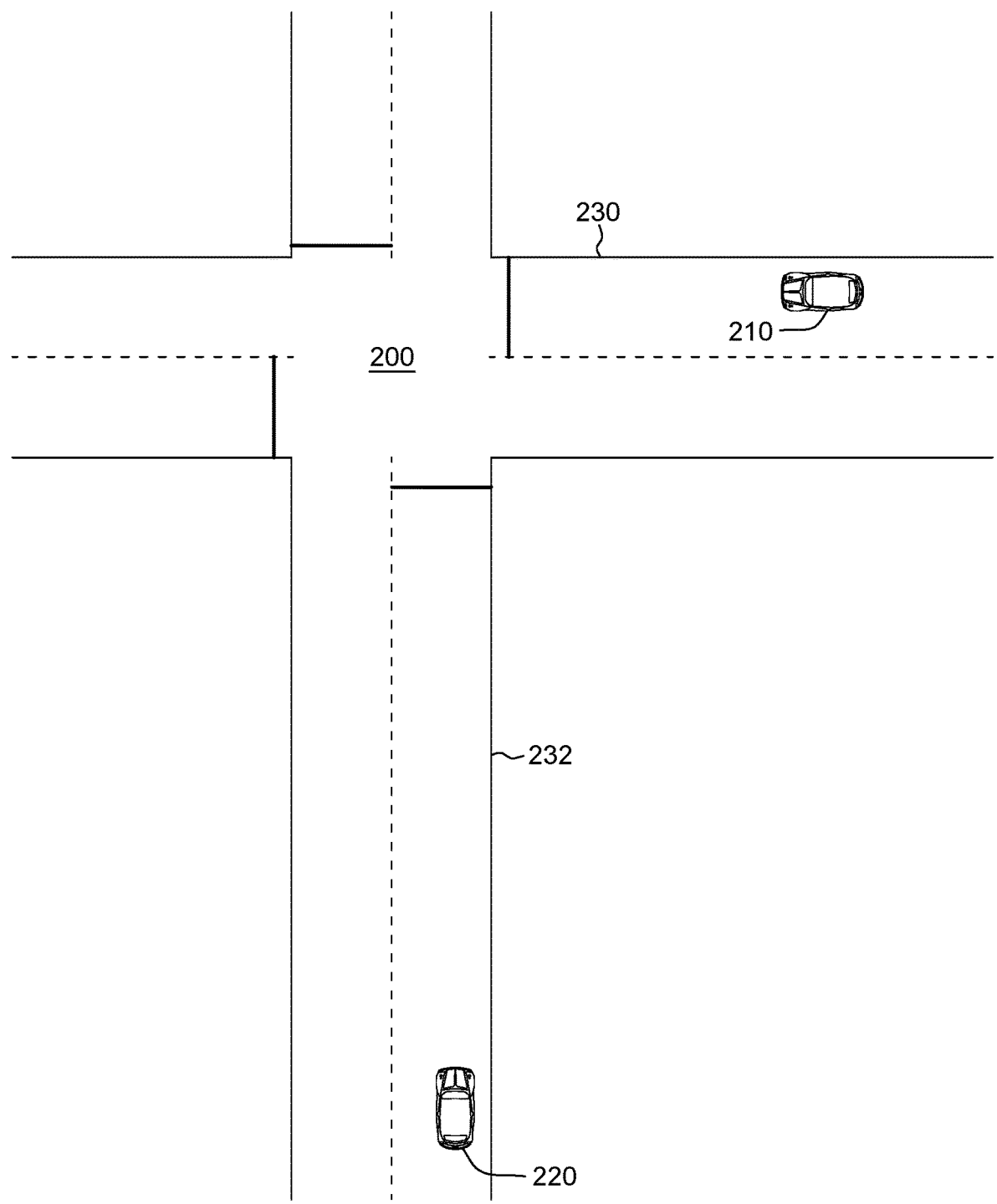
FIG. 2 is an example scenario for the avoidance program when two vehicles approach an intersection from different directions, in accordance with an embodiment of the present invention.

FIG. 2 is an illustration of one example scenario for avoidance program 112, of one possible embodiment of the present invention. In this example, two vehicles approach an intersection from different directions. In this example, road 230 and road 232 cross at intersection 200. Vehicle 210 approaches intersection 200 on road 230. Vehicle 220 approaches intersection 200 on road 232. In one embodiment, if both vehicles are normal vehicles and the current speeds of vehicle 210 and vehicle 220 project that vehicle 210 would arrive at the intersection only slightly before vehicle 220, leaving insufficient safety margin, then vehicle 220 would slow down to allow vehicle 210 to safely pass through the intersection before vehicle 220, (this example uses the first in, first out method to determine the order the vehicles should enter intersection 200). In some embodiments, however, if vehicle 220 is an emergency vehicle, avoidance program 112 will instruct vehicle 210 to slow down to allow emergency vehicle 220 to pass first. In another embodiment, if vehicle 210 is a normal vehicle, and vehicle 220 is a green vehicle (lower emissions, alternative fuel, etc.), then vehicle 220 is allowed to pass through the intersection before vehicle 210, and vehicle 210 will be instructed to change its speed to allow vehicle 220 to cross first. The scenario illustrated in FIG. 2 is described in FIGS. 4a and 4b below.

Figure 3:
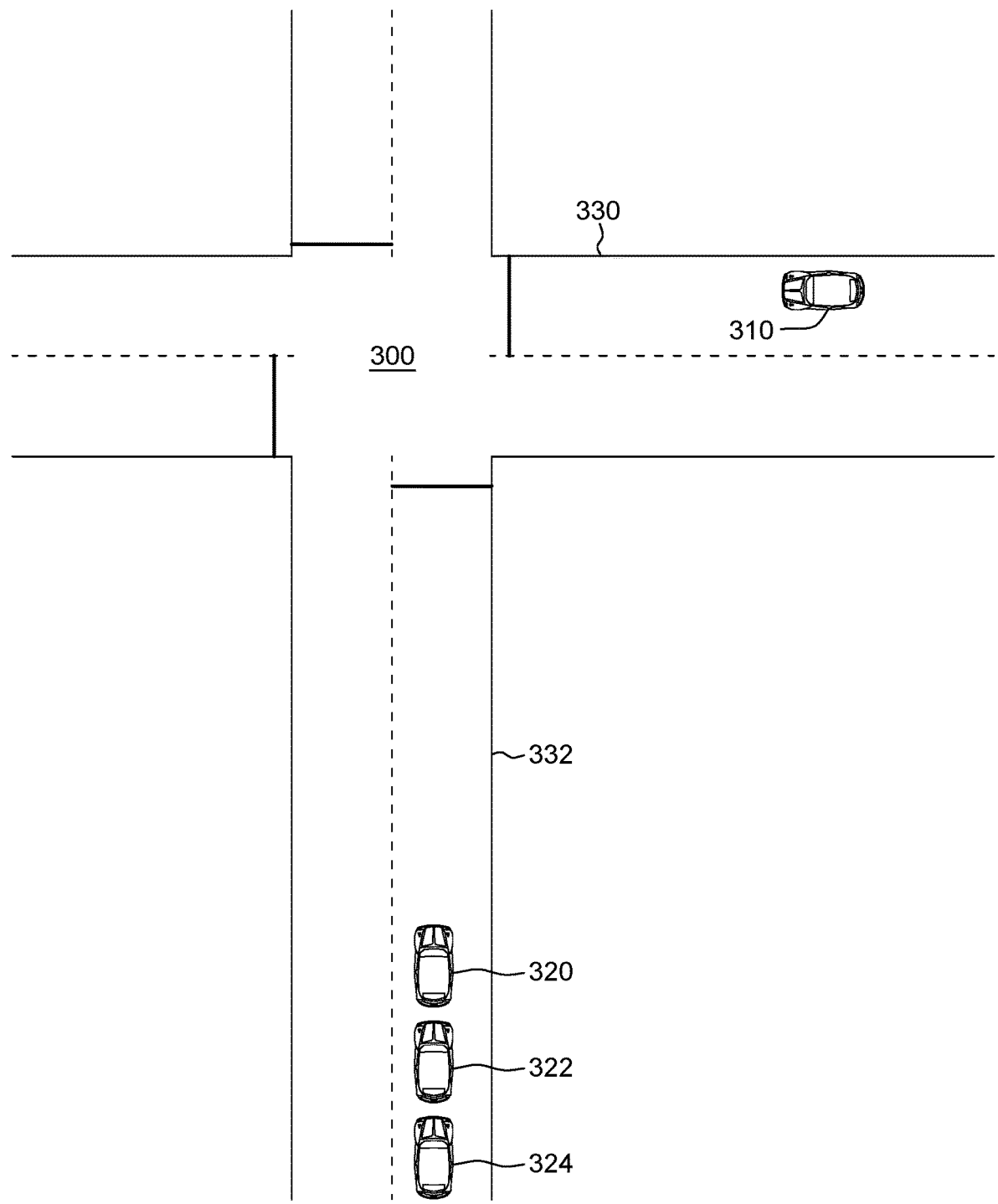
FIG. 3 is an example scenario for the avoidance program when a convoy of vehicles approaches an intersection at the same time as a vehicle approaches the same intersection from a different direction, in accordance with an embodiment of the present invention.

FIG. 3 is an illustration of one example scenario for avoidance program 112, of one possible embodiment of the present invention. This example illustrates a scenario for avoidance program 112 when a convoy of vehicles approaches an intersection at the same time as a vehicle approaches the same intersection from a different direction. In this example, road 330 and road 332 cross at intersection 300. Vehicle 310 approaches intersection 300 on road 330. Vehicles 320, 322, and 324 approach intersection 300 on road 332. In an embodiment, if vehicles 320, 322, and 324 are not already part of a convoy, then avoidance program 112 will build a convoy of vehicles 320, 322, and 324 if the vehicles meet the appropriate criteria, as explained in FIGS. 6a, 6b, and 6c below. In another embodiment, if vehicles 320 and 322, for example, are already part of a convoy, then avoidance program add vehicle 324 to the convoy, if the vehicles meet the appropriate criteria, as explained in FIGS. 6a, 6b, and 6c below.

Figure 4A:
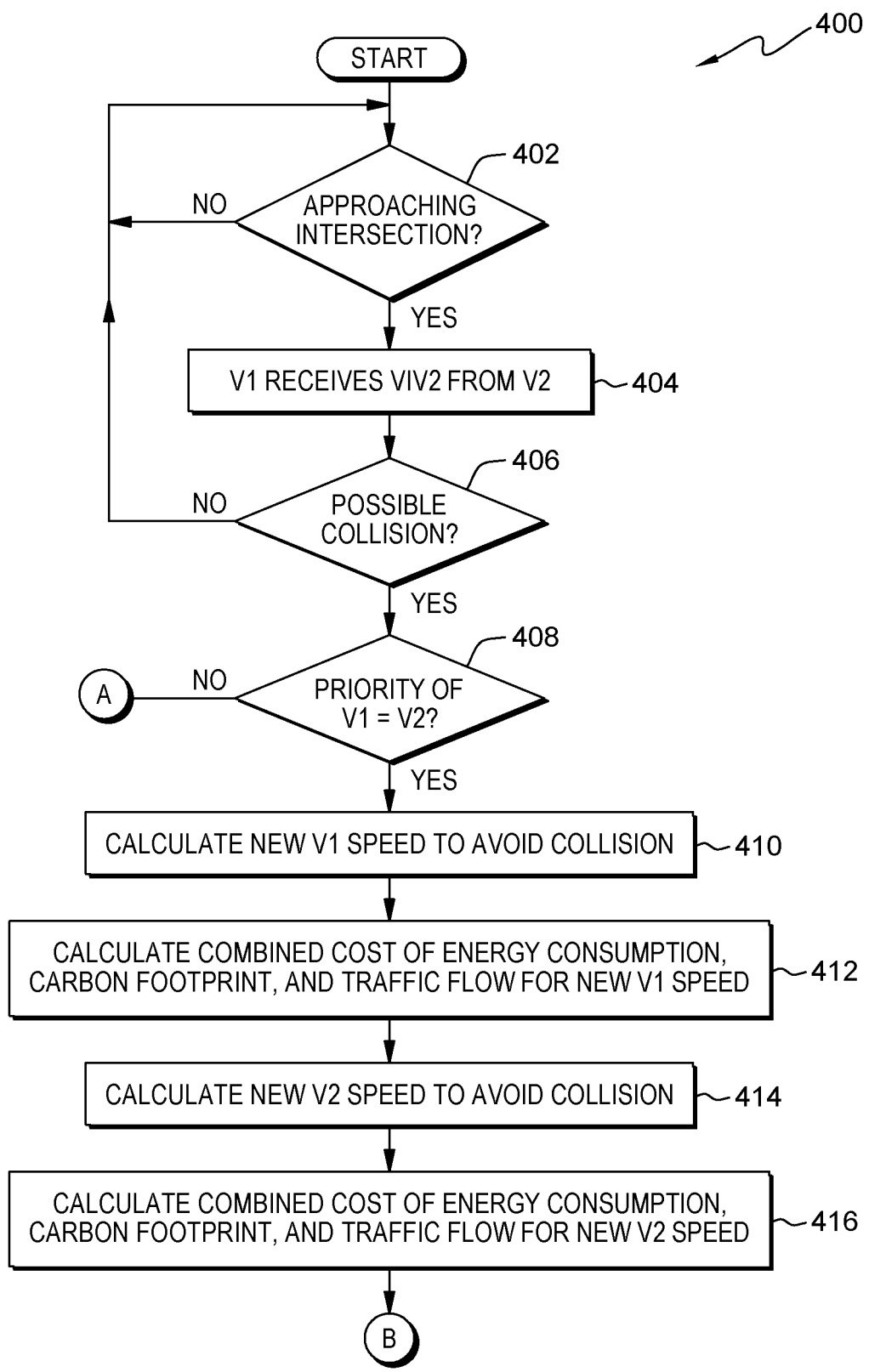
FIGS. 4a and 4b are a flowchart depicting operational steps for the crossing management function of avoidance program 112 on a computing device in a vehicle approaching an intersection, within the distributed data processing environment of FIG. 1, for collaborative accident prevention, in accordance with an embodiment of the present invention.
Figure 4B:
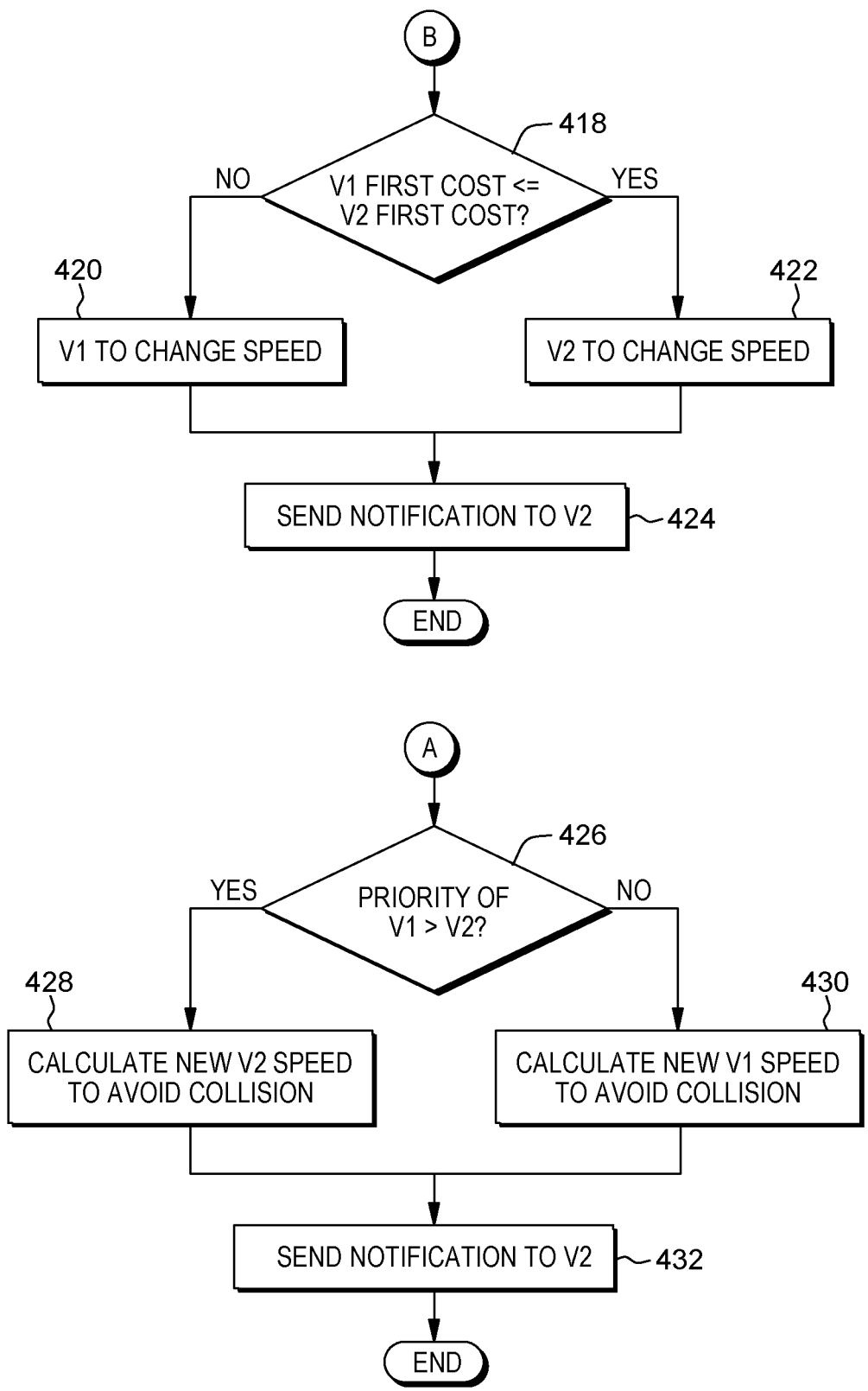

Once avoidance program 112 has completed assembling the convoy, then avoidance program 112 uses the same procedure in FIGS. 4a and 4b as for the two car scenario of FIG. 2, but using the first vehicle in the convoy, e.g., vehicle 320, for the analysis with the vehicle approaching the intersection from another direction, e.g., vehicle 310.

FIGS. 4a and 4b are a flow chart diagram of workflow 400 depicting operational steps for the crossing management function of avoidance program 112, 122, 132, 142, and 152 for collaborative accident prevention. In various embodiments, workflow 400 may be executed in addition to either workflow 500, when more than two vehicles approach the same intersection, or workflow 600, when a convoy of vehicles approaches an intersection when another vehicle is approaching the same intersection from a different direction.

In an alternative embodiment, the steps of workflow 400 may be performed by any other program while working with avoidance program 112, 122, 132, 142, and 152. It should be appreciated that the process depicted in FIGS. 4a and 4b illustrates one possible iteration of avoidance program 112, 122, 132, 142, and 152, which repeats each time the vehicle containing the computing device running avoidance program 112, 122, 132, 142, or 152 approaches an intersection.

It should be noted that workflow 400 is written from the perspective of avoidance program 112 running on computing device 110 in a vehicle V1, e.g., vehicle 210 from FIG. 2, but the same program is running as avoidance program 122 on computing device 120 in a vehicle V2, e.g., vehicle 220 from FIG. 2. The identical algorithm is performed by each copy of the avoidance program running on the computing device in each vehicle. In an embodiment, each copy of the avoidance program compares the results it calculated to the results received from the copy of the avoidance program running on the computing device in the other vehicle, and only proceeds if the results are identical. In an embodiment, if the results are not identical, then the avoidance program in each vehicle notifies the driver to manually determine which vehicle should proceed first.

In an embodiment, avoidance program 112 running on computing device 110 in vehicle V1 detects that vehicle V1 (e.g., vehicle 210 from FIG. 2) is approaching an intersection. In an embodiment, avoidance program 112 running on computing device 110 in vehicle V1 receives a Vehicle Information Vector (VIV) VIV2 from avoidance program 122 running on computing device 120 in vehicle V2. In an embodiment, avoidance program 112 running on computing device 110 in vehicle V1 determines if there is a possibility of a collision based on the information in both VIV1 and VIV2. In an embodiment, if avoidance program 112 determines that there is a possibility of a collision, then avoidance program 112 determines if the two vehicles have the same priority. In an embodiment, if avoidance program 112 determines that the two vehicles do have the same priority, then avoidance program 112 calculates the new speed for V1 that will avoid any possibility of collision, including the safety factor, if V2 does not change speed. In an embodiment, avoidance program 112 calculates the combined cost factors for V1 and V2 at the new V1 speed, keeping V2 at the current V2 speed, for the case of V2 proceeding through the intersection first. In an embodiment, avoidance program 112 calculates the new speed for V2 that will avoid any possibility of collision, including the safety factor. In an embodiment, avoidance program 112 calculates the combined cost factors for V1 and V2 at the new V2 speed, keeping V1 at the current V1 speed, for the case of V1 proceeding through the intersection first. In an embodiment, avoidance program 112 compares the total cost of all the factors determined in step 412 for V1 and V2 if V1 changes speed and V2 maintains its speed (the V2 first case) to the total cost of all the factors determined in steps 416 for V1 and V2 if V2 changes speed and V1 maintains its speed (the V1 first case). In an embodiment, if avoidance program 112 determines that the cost of the V1 first case is not less than or equal to the cost of the V2 first case, then avoidance program 112 determines that V1 should change speed to allow V2 to pass through the intersection first. In an embodiment, if avoidance program 112 determines that the cost of the V1 first case is less than or equal to the cost of the V2 first case, then avoidance program 112 determines that V2 should change speed to allow V1 to pass through the intersection first. In an embodiment, avoidance program 112 sends the NewVIV1 and NewVIV2 to avoidance program 122 in computing device 120 in V2 to notify V2 of the determination of which vehicle should proceed through the intersection first, and what speed each vehicle must maintain to avoid a collision at the intersection. In an embodiment, if avoidance program 112 determines that the two vehicles do not have the same priority, then avoidance program 112 determines if V1 has a higher priority than V2. In an embodiment, if avoidance program 112 determines that V1 has a higher priority than V2, then avoidance program 112 calculates a new speed for V2 that will avoid any possibility of collision, including the safety factor. In an embodiment, if avoidance program 112 determines that V1 does not have a higher priority than V2, then avoidance program 112 calculates a new speed for V1 that will avoid any possibility of collision, including the safety factor. In an embodiment, avoidance program 112 sends the NewVIV1 and a NewVIV2 to avoidance program 122 on computing device 120 in V2 to notify V2 of the determination of which vehicle should proceed through the intersection first, and the speed each vehicle must maintain to avoid a collision at the intersection. Avoidance program 112 then ends for this cycle.

It should be appreciated that embodiments of the present invention provide at least for collaborative accident prevention. However, FIGS. 4a and 4b provide only an illustration of one implementation and does not imply any limitations with regard to the environments in which different embodiments may be implemented. Many modifications to the depicted environment may be made by those skilled in the art without departing from the scope of the invention as recited by the claims.

Avoidance program 112 determines if the vehicle is approaching an intersection (decision block 402). In an embodiment, avoidance program 112 running on computing device 110 in vehicle V1 detects that vehicle V1 (e.g., vehicle 210 from FIG. 2) is approaching an intersection. In an embodiment, a global positioning system or navigation system incorporated into computing device 110 provides the coordinates of the vehicle. In another embodiment, a global positioning system or navigation system incorporated into the vehicle, or incorporated into another computing device present in the vehicle, such as a smart phone or tablet computer, provides the coordinates of the vehicle. In an embodiment, when avoidance program 112 in vehicle V1 detects that it is approaching an intersection, avoidance program 112 broadcasts VIV1. In an embodiment, avoidance program 112 broadcasts VIV1 to notify avoidance program 122 running on computing device 120 in vehicle V2 (e.g., vehicle 220 from FIG. 2) that vehicle V1 is approaching the intersection.

In various embodiments, the VIV may include data characterizing the vehicle such as a unique vehicle identifier Vid (which identifies the instance of avoidance program 112; no personal information is included), a vehicle priority P (e.g., highest priority is for emergency vehicles), and weighting coefficients of the selection criteria including energy consumption WE, carbon dioxide emission WCO2, and time as a measure of fluidity WT, i.e., the urgency of arriving at a destination by a certain time. In an embodiment, this data is identical for all vehicles by default, and must be changed in order for any of these factors to affect the decision. In some embodiments the VIV may include a vehicle crossing time interval, i.e., how long the vehicle will take to cross the intersection at the current speed.

Avoidance program 112 receives VIV2 from V2 (step 404). In an embodiment, avoidance program 112 running on computing device 110 in vehicle V1 receives VIV2 from avoidance program 122 running on computing device 120 in vehicle V2.

Avoidance program 112 determines if there is a possible collision (decision block 406). In an embodiment, avoidance program 112 running on computing device 110 in vehicle V1 determines if there is a possibility of a collision based on the information in both VIV1 and VIV2. Avoidance program 112 calculates the time that each vehicle will enter the intersection based on the speed, distance, and direction information received in each VIV, and will add a safety factor to the projected time of arrival, to determine if the second vehicle to reach the intersection will reach the intersection after the projected exit time of the first vehicle to reach the intersection, plus the safety factor. If the second vehicle will reach the intersection before the first vehicle has cleared the intersection, plus the safety factor, then avoidance program 112 determines that a collision is possible. If avoidance program 112 determines that there is no possibility of a collision, then avoidance program 112 ends for this cycle.

Avoidance program 112 determines if the priority of V1=V2 (decision block 408). In an embodiment, if avoidance program 112 determines that there is a possibility of a collision ("yes" branch, decision block 406), then avoidance program 112 determines if the two vehicles have the same priority. In an embodiment, emergency vehicles have priority over non-emergency vehicles. In another embodiment, more efficient or "greener" vehicles have priority over regular or "non-green" vehicles. In other embodiments, any other type of vehicle may be assigned a priority, for example, mass transit vehicles have priority over regular vehicles, etc. In an embodiment, the priority hierarchy is a system default.

In an embodiment, if avoidance program 112 determines that the two vehicles do not have the same priority ("no" branch, decision block 408), then avoidance program 112 proceeds to decision block 426 to determine which vehicle has higher priority.

Avoidance program 112 calculates a new V1 speed to avoid the collision (step 410). In an embodiment, if avoidance program 112 determines that the two vehicles do have the same priority ("yes" branch, decision block 408), then avoidance program 112 calculates the new speed for V1 that will avoid any possibility of collision, including the safety factor, if V2 does not change speed. In an embodiment, avoidance program 112 uses this calculated speed in step 412 below to calculate a combined cost factor for both V1 and V2 if V1 changes speed.

Avoidance program 112 calculates the combined cost of energy consumption, carbon footprint, and traffic flow for the new V1 speed (step 412). In an embodiment, avoidance program 112 calculates the combined cost factors for V1 and V2 at the new V1 speed, keeping V2 at the current V2 speed, for the case of V2 proceeding through the intersection first. In various embodiments, the combined cost factor includes energy consumption (per mile, or per unit of time), the carbon footprint of each vehicle, and the overall traffic flow through the intersection. For example, with all else being equal between V1 and V2, if V2 would reach the intersection first, but by slowing V1 the overall traffic flow through the intersection would be impeded (e.g., V1 is the first vehicle in a convoy, and the entire convoy would have to slow to allow V2 to proceed first), then the cost factor for V1 will be higher.

Avoidance program 112 calculates a new V2 speed to avoid the collision (step 414). In an embodiment, avoidance program 112 calculates the new speed for V2 that will avoid any possibility of collision, including the safety factor. In an embodiment, avoidance program 112 uses this calculated speed in step 416 below to calculate a combined cost factor for both V1 and V2 if V2 changes speed.

Avoidance program 112 calculates the combined cost of energy consumption, carbon footprint, and traffic flow for the new V2 speed (step 416). In an embodiment, avoidance program 112 calculates the combined cost factors for V1 and V2 at the new V2 speed, keeping V1 at the current V1 speed, for the case of V1 proceeding through the intersection first. In various embodiments, the combined cost factor includes energy consumption (per mile, or per unit of time), the carbon footprint of each vehicle, and the overall traffic flow through the intersection. For example, with all else being equal between V2 and V1, if V1 would reach the intersection first, but by slowing V2 the overall traffic flow through the intersection would be impeded (e.g., V2 is the first vehicle in a convoy, and the entire convoy would have to slow to allow V1 to proceed first), then the cost factor for V2 will be higher.

Avoidance program 112 determines if the V1 first cost<=V2 first cost (decision block 418). In an embodiment, avoidance program 112 compares the total cost of all the factors determined in step 412 for V1 and V2 if V1 changes speed and V2 maintains its speed (the V2 first case) to the total cost of all the factors determined in steps 416 for V1 and V2 if V2 changes speed and V1 maintains its speed (the V1 first case). In an embodiment, if avoidance program 112 determines that the cost of the V1 first case is less than or equal to the cost of V2 first case ("yes" branch, decision block 418), then avoidance program 112 proceeds to step 422.

Avoidance program 112 determines that V1 is to change speed (step 420). In an embodiment, if avoidance program 112 determines that the cost of the V1 first case is not less than or equal to the cost of the V2 first case ("no" branch, decision block 418), then avoidance program 112 determines that V1 should change speed to allow V2 to pass through the intersection first. In an embodiment, avoidance program 112 builds a NewVIV1 reflecting the V1 speed change and a NewVIV2 equal to the original VIV2. In an embodiment, avoidance program 112 notifies the driver of V1 that V1 is to change speed. In an embodiment, avoidance program 112 notifies the driver of V1 to change speed by displaying a message on computing device 110 in V1. In another embodiment, avoidance program 112 notifies the driver of V1 to change speed by displaying a message on the dashboard of V1. Avoidance program 112 then proceeds to step 424.

Avoidance program 112 determines that V2 to change speed (step 422). In an embodiment, avoidance program 112 determines that V2 should change speed to allow V1 to pass through the intersection first. In an embodiment, avoidance program 112 builds a NewVIV1 equal to the original VIV1 and a NewVIV2 reflecting the V2 speed change.

Avoidance program 112 sends a notification to V2 (step 424). In an embodiment, avoidance program 112 sends the NewVIV1 and NewVIV2 to avoidance program 122 in computing device 120 in V2 to notify V2 of the determination of which vehicle should proceed through the intersection first, and what speed each vehicle must maintain to avoid a collision at the intersection. In an embodiment, the NewVIV1 and NewVIV2 are based on the data from the original VIV1 and VIV2 and the new speed calculated in step 412 or step 416. In an embodiment, avoidance program 112 on computing device 110 in V1 compares the values of NewVIV1 and NewVIV2 received from avoidance program 122 on computing device 120 in V2 to ensure both programs calculated the same results for added safety. Avoidance program 112 then ends for this cycle.

Avoidance program 112 determines if the priority of V1>V2 (decision block 426). In an embodiment, if avoidance program 112 determines that the two vehicles do not have the same priority ("no" branch, decision block 408), then avoidance program 112 determines if V1 has a higher priority than V2. In an embodiment, avoidance program 112 will use the priority scheme established in decision block 408. In an embodiment, avoidance program 112 will compare the priority value from its VIV1 to the priority value of VIV2 from V2 to determine which vehicle has the higher priority. In an embodiment, if avoidance program 112 determines that V1 does not have a higher priority than V2 ("no" branch, decision block 426), then avoidance program 112 proceeds to step 430.

Avoidance program 112 calculates a new V2 speed to avoid a collision (step 428). In an embodiment, if avoidance program 112 determines that V1 has a higher priority than V2 ("yes" branch, decision block 426), then avoidance program 112 calculates a new speed for V2 that will avoid any possibility of collision, including the safety factor. In an embodiment, avoidance program 112 creates a new VIV, NewVIV2, based on the data from the original VIV2 and the new V2 speed calculated in this step, as well as a NewVIV1 equal to VIV1. Avoidance program 112 then proceeds to step 432.

Avoidance program 112 calculates a new V1 speed to avoid a collision (step 430). In an embodiment, if avoidance program 112 determines that V1 does not have a higher priority than V2 ("no" branch, decision block 426), then avoidance program 112 calculates a new speed for V1 that will avoid any possibility of collision, including the safety factor. In an embodiment, avoidance program 112 creates a new VIV, NewVIV1 based on the data from the original VIV1 and the new V1 speed calculated in this step, as well as a NewVIV2 equal to VIV2.

Avoidance program 112 sends a notification to V2 (step 432). In an embodiment, avoidance program 112 sends the NewVIV1 and a NewVIV2 to avoidance program 122 on computing device 120 in V2 to notify V2 of the determination of which vehicle should proceed through the intersection first, and the speed each vehicle must maintain to avoid a collision at the intersection. Avoidance program 112 then ends for this cycle.

Figure 5:
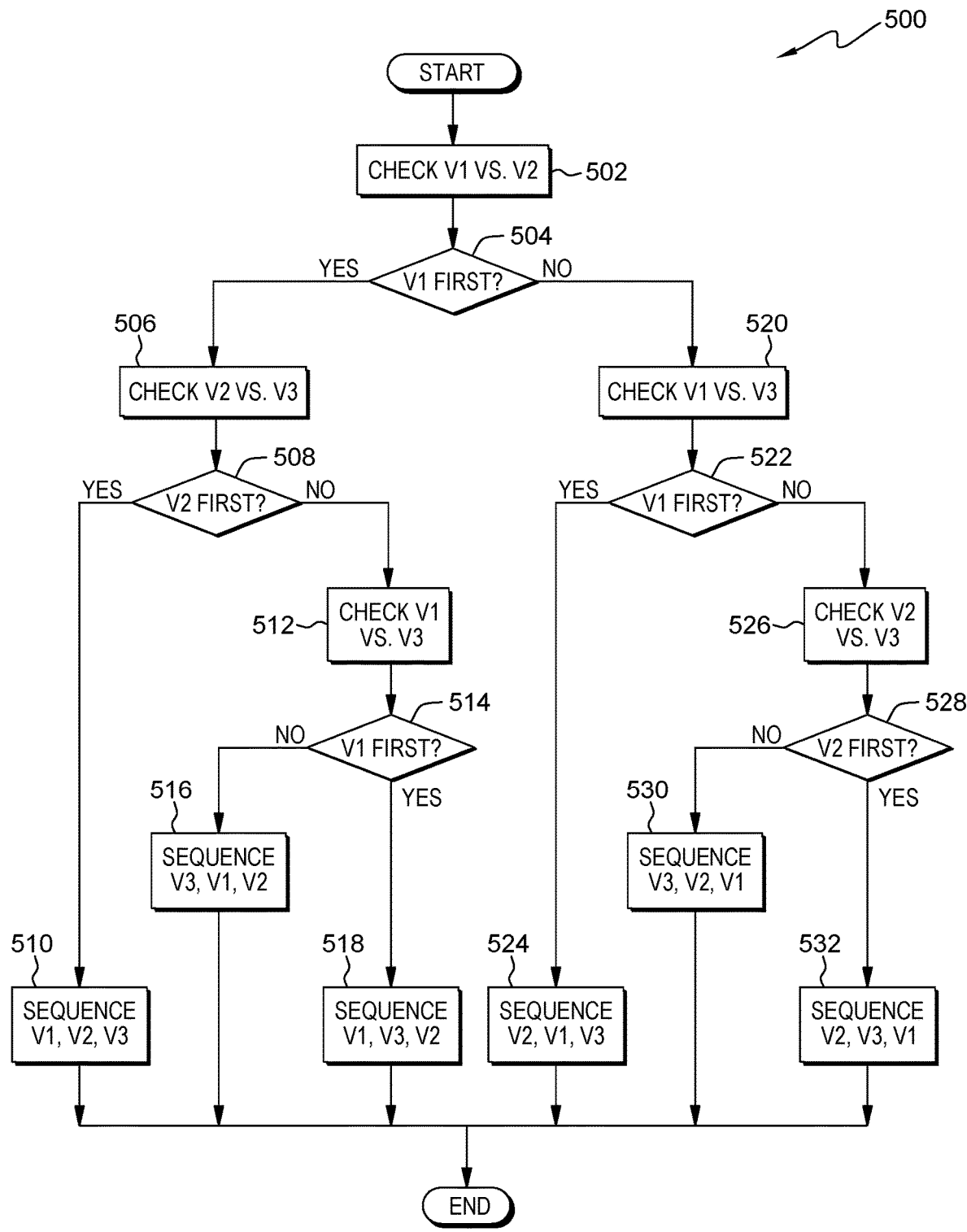
FIG. 5 is a flowchart depicting operational steps of the avoidance program on a computing device in a vehicle when three or more vehicles are approaching an intersection, within the distributed data processing environment of FIG. 1, for collaborative accident prevention, in accordance with an embodiment of the present invention.

FIG. 5 is a flow chart diagram of workflow 500 depicting operational steps for avoidance program 112, 122, 132, 142, and 152 for collaborative accident prevention, when more than two vehicles approach the same intersection. In an embodiment, after workflow 500 determines the order of the vehicles, workflow 400 will then determine the speed changes for the vehicles.

In an alternative embodiment, the steps of workflow 500 may be performed by any other program while working with avoidance program 112, 122, 132, 142, or 152. It should be appreciated that the process depicted in FIG. 5 illustrates one possible iteration of avoidance program 112, 122, 132, 142, and 152, which repeats each time the vehicle containing the computing device running avoidance program 112, 122, 132, 142, or 152 approaches an intersection when three or more vehicles are approaching the same intersection. It should be noted that the process below describes the procedure for three vehicles, but the process is iterative and is repeated for any number of vehicles approaching the same intersection. The method depicted in FIG. 5 involves iterative decomposition of the set of three or more vehicles into pairs that can be ordered using the process described with FIGS. 4a and 4b.

It should be noted that workflow 500 is written from the perspective of avoidance program 112 running on computing device 110 in a vehicle V1, but the same program is running as avoidance program 122 on computing device 120 in a vehicle V2, avoidance program 132 on computing device 130 in a vehicle V3, avoidance program 142 on computing device 140 in a vehicle V4, avoidance program 152 on computing device 150 in a vehicle V5, or as many vehicles as are approaching the intersection. The identical algorithm is performed by each copy of the avoidance program running on the computing device in each vehicle. In an embodiment, each copy of the avoidance program compares the results it calculated to the results received from the copy of the avoidance program running on the computing devices in the other vehicles, and only proceeds if the results are identical. In an embodiment, if the results are not identical, then the avoidance program in each vehicle notifies the driver to manually determine which vehicle should proceed first.

In an embodiment, avoidance program 112 determines which vehicle, V1 or V2, will reach the intersection first. In an embodiment, if avoidance program 112 determines that V1 will reach the intersection first, then avoidance program 112 determines which vehicle, V2 or V3, will reach the intersection next. In an embodiment, if avoidance program 112 determines that V2 will reach the intersection before V3, then avoidance program 112 sets the sequence for the vehicles to V1, then V2, and finally V3. In an embodiment, if avoidance program 112 determines that V2 will not reach the intersection first, then avoidance program 112 determines which vehicle, V1 or V3, will reach the intersection first. In an embodiment, if avoidance program 112 determines that V1 will not reach the intersection before V3, then avoidance program 112 sets the sequence for the vehicles to V3, then V1, and finally V2. In an embodiment, if avoidance program 112 determines that V1 will reach the intersection before V3, then avoidance program 112 sets the sequence for the vehicles to V1, then V3, and finally V2. In an embodiment, if avoidance program 112 determines that V1 will not reach the intersection before V2 ("no" branch, decision block 504), then avoidance program 112 determines whether V1 or V3 will reach the intersection first. In an embodiment, if avoidance program 112 determines that V1 will reach the intersection before V3, then avoidance program 112 sets the sequence for the vehicles to V2, then V1, and finally V3. In an embodiment, if avoidance program 112 determines that V1 will not reach the intersection before V3, then avoidance program 112 determines which vehicle, V2 or V3, will reach the intersection first. In an embodiment, if avoidance program 112 determines that V2 will not reach the intersection before V3, then avoidance program 112 sets the sequence for the vehicles to V3, then V2, and finally V1. In an embodiment, if avoidance program 112 determines that V1 will not reach the intersection before V3 ("no" branch, decision block 528), then avoidance program 112 sets the sequence for the vehicles to V2, then V3, and finally V1.

It should be appreciated that embodiments of the present invention provide at least for collaborative accident prevention. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Avoidance program 112 checks V1 vs. V2 (step 502). In an embodiment, avoidance program 112 determines which vehicle, V1 or V2, will reach the intersection first using the process described in FIGS. 4a and 4b.

Avoidance program 112 determines if V1 is first (decision block 504). In an embodiment, if avoidance program 112 determines that V2 will go through the intersection before V1 ("no" branch, decision block 504), then avoidance program 112 proceeds to step 520.

Avoidance program 112 checks V2 vs. V3 (decision block 506). In an embodiment, if avoidance program 112 determines that V1 will reach the intersection first ("yes" branch, decision block 504), then avoidance program 112 determines which vehicle, V2 or V3, will go through the intersection next, using the process described in FIGS. 4a and 4b.

Avoidance program 112 determines if V2 is first (decision block 508). In an embodiment, if avoidance program 112 determines that V3 will go through the intersection next ("no" branch, decision block 508), then avoidance program 112 proceeds to step 512.

Avoidance program 112 sets the sequence to V1, V2, V3 (step 510). In an embodiment, if avoidance program 112 determines that V2 will go through the intersection before V3 ("yes" branch, decision block 508), then avoidance program 112 sets the sequence for the vehicles to V1, then V2, and finally V3. In an embodiment, avoidance program 112 determined the sequence by iteratively applying the process in FIGS. 4a and 4b to the vehicles two by two. In an embodiment, NewVIV vectors are broadcast for each vehicle during each iteration of the process described in FIGS. 4a and 4b. Therefore, each vehicle has received updated intersection crossing information. Avoidance program 112 then ends for this cycle.

Avoidance program 112 checks V1 vs. V3 (step 512). In an embodiment, if avoidance program 112 determines that that V3 will go through the intersection before V2 ("no" branch, decision block 508), then avoidance program 112 determines which vehicle, V1 or V3, will go through the intersection first, using the process described in FIGS. 4a and 4b.

Avoidance program 112 determines if V1 is first (decision block 514). In an embodiment, if avoidance program 112 determines that V1 will go through the intersection before V3 ("yes" branch, decision block 514), then avoidance program 112 proceeds to step 518.

Avoidance program 112 sets the sequence to V3, V1, V2 (step 516). In an embodiment, if avoidance program 112 determines that V1 will not go through the intersection before V3 ("no" branch, decision block 514), then avoidance program 112 sets the sequence for the vehicles to V3, then V1, and finally V2. In an embodiment, avoidance program 112 determined the sequence by iteratively applying the process in FIGS. 4a and 4b to the vehicles two by two. In an embodiment, NewVIV vectors are broadcast for each vehicle during each iteration of the process described in FIGS. 4a and 4b. Therefore, each vehicle has received updated intersection crossing information. Avoidance program 112 then ends for this cycle.

Avoidance program 112 sets the sequence to V1, V3, V2 (step 518). In an embodiment, if avoidance program 112 determines that V1 will go through the intersection before V3 ("yes" branch, decision block 514), then avoidance program 112 sets the sequence for the vehicles to V1, then V3, and finally V2. In an embodiment, avoidance program 112 determined the sequence by iteratively applying the process in FIGS. 4a and 4b to the vehicles two by two. In an embodiment, NewVIV vectors are broadcast for each vehicle during each iteration of the process described in FIGS. 4a and 4b. Therefore, each vehicle has received updated intersection crossing information. Avoidance program 112 then ends for this cycle.

Avoidance program 112 checks V1 vs. V3 (step 520). In an embodiment, if avoidance program 112 determines that V1 will not go through the intersection before V2 ("no" branch, decision block 504), then avoidance program 112 determines whether V1 or V3 will reach the intersection first. In an embodiment, avoidance program 112 has determined that V2 will go through the intersection first by applying the process in FIGS. 4a and 4b to V1 and V2 in step 502.

Avoidance program 112 determines if V1 is first (decision block 522). In an embodiment, if avoidance program 112 determines that V1 will not go through the intersection before V3 ("no" branch, decision block 522), then avoidance program 112 proceeds to step 526.

Avoidance program 112 sets the sequence to V2, V1, V3 (step 524). In an embodiment, if avoidance program 112 determines that V1 will go through the intersection before V3 ("yes" branch, decision block 522), then avoidance program 112 sets the sequence for the vehicles to V2, then V1, and finally V3. In an embodiment, avoidance program 112 determined the sequence by iteratively applying the process in FIGS. 4a and 4b to the vehicles two by two. In an embodiment, NewVIV vectors are broadcast for each vehicle during each iteration of the process described in FIGS. 4a and 4b. Therefore, each vehicle has received updated intersection crossing information. Avoidance program 112 then ends for this cycle.

Avoidance program 112 checks V2 vs. V3 (step 526). In an embodiment, if avoidance program 112 determines that V1 will not go through the intersection before V3 ("no" branch, decision block 522), then V1 will cross the intersection last of V1, V2, and V3, and therefore avoidance program 112 determines which vehicle, V2 or V3, will go through the intersection first. In an embodiment, avoidance program 112 applies the process in FIGS. 4a and 4b to V2 and V3 to determine which vehicle will go through the intersection next.

Avoidance program 112 determines if V2 is first (decision block 528). In an embodiment, if avoidance program 112 determines that V2 will go through the intersection before V3 ("yes" branch, decision block 528), then avoidance program 112 proceeds to step 532.

Avoidance program 112 sets the sequence to V3, V2, V1 (step 530). In an embodiment, if avoidance program 112 determines that V2 will not go through the intersection before V3 ("no" branch, decision block 528), then avoidance program 112 sets the sequence for the vehicles to V3, then V2, and finally V1. In an embodiment, avoidance program 112 determined the sequence by iteratively applying the process in FIGS. 4a and 4b to the vehicles two by two. In an embodiment, NewVIV vectors are broadcast for each vehicle during each iteration of the process described in FIGS. 4a and 4b. Therefore, each vehicle has received updated intersection crossing information. Avoidance program 112 then ends for this cycle.

Avoidance program 112 sets the sequence to V2, V3, V1 (step 532). In an embodiment, if avoidance program 112 determines that V1 will not reach the intersection before V3 ("no" branch, decision block 528), then avoidance program 112 sets the sequence for the vehicles to V2, then V3, and finally V1. In an embodiment, avoidance program 112 determined the sequence by iteratively applying the process in FIGS. 4a and 4b to the vehicles two by two. In an embodiment, NewVIV vectors are broadcast for each vehicle during each iteration of the process described in FIGS. 4a and 4b. Therefore, each vehicle has received updated intersection crossing information. Avoidance program 112 then ends for this cycle.

Figure 6A:
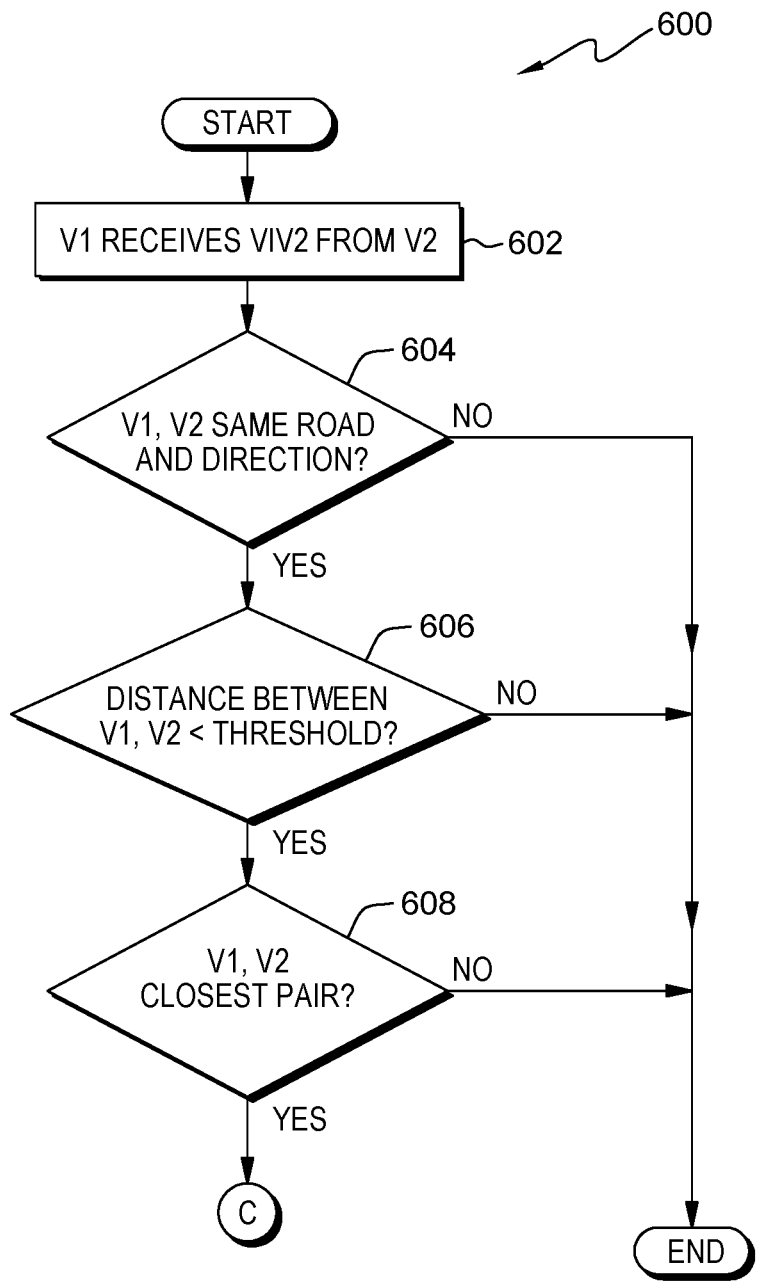
FIGS. 6a, 6b, and 6c are a flowchart depicting operational steps of the avoidance program on a computing device in a vehicle when a convoy of vehicles are approaching an intersection, within the distributed data processing environment of FIG. 1, for collaborative accident prevention, in accordance with an embodiment of the present invention.
Figure 6B:
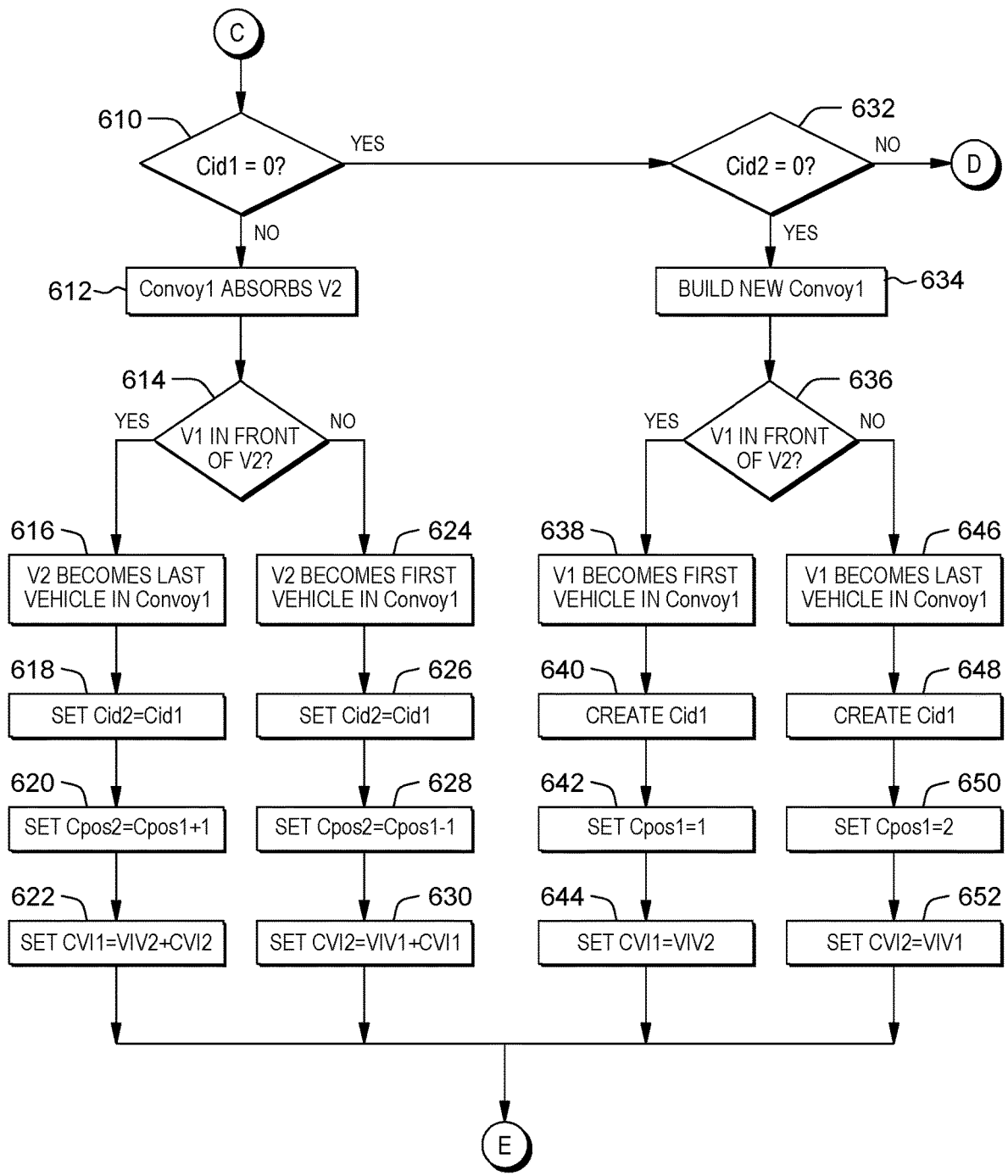
Figure 6C:
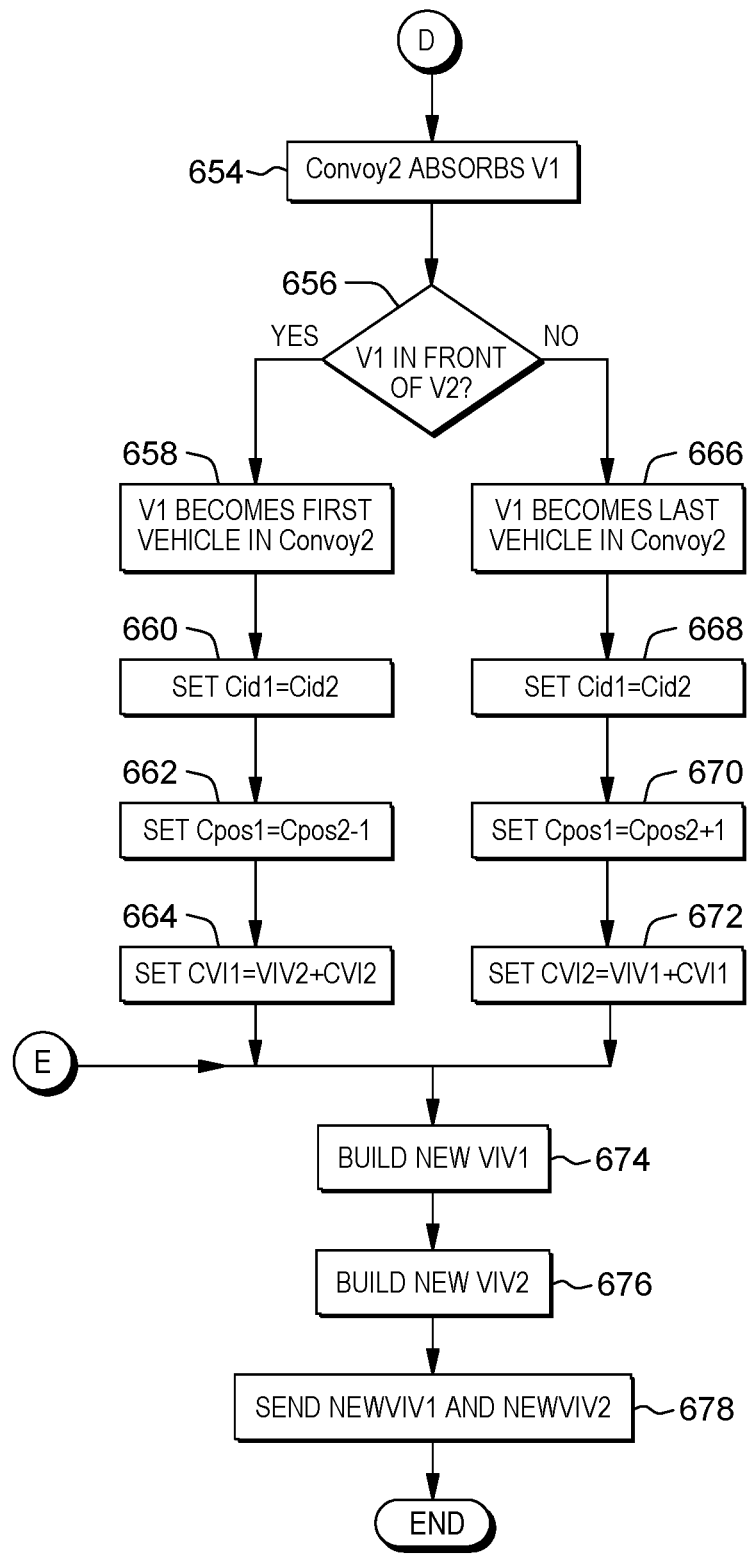

FIGS. 6a, 6b, and 6c are a flow chart diagram of workflow 600 depicting operational steps for the functions of avoidance program 112, 122, 132, 142, and 152 for collaborative accident prevention when a convoy, or potential convoy, approaches an intersection. It should be noted that, in the specific context of avoidance program 112, 122, 132, 142, and 152, the notion of convoy is dynamic and circumstantial: vehicles that are approaching the same crossing from the same direction and that are detected to be close to each other within a threshold are dynamically assembled into a logical convoy by avoidance program 112, 122, 132, 142, and 152. Vehicles that have been included into such convoy are subsequently released from the convoy by avoidance program 112, 122, 132, 142, and 152 as they exit the intersection area.

In an alternative embodiment, the steps of workflow 600 may be performed by any other program while working with avoidance program 112, 122, 132, 142, and 152. It should be appreciated that the process depicted in FIGS. 6a, 6b, and 6c illustrate one possible iteration of avoidance program 112, 122, 132, 142, and 152, which repeats each time the vehicle containing the computing device running avoidance program 112, 122, 132, 142, or 152 approaches an intersection. It should be noted that the process below describes the procedure for three vehicles in a convoy, but the process is iterative and is repeated for any number of vehicles approaching the same intersection in the same direction. In an embodiment, there is a maximum convoy size allowed. In an embodiment, the maximum convoy size is a system default.

It should be noted that workflow 600 is written from the perspective of avoidance program 112 running on computing device 110 in a vehicle V1, but the same program is running as avoidance program 122 on computing device 120 in a vehicle V2, avoidance program 132 on computing device 130 in a vehicle V3, avoidance program 142 on computing device 140 in a vehicle V4, avoidance program 152 on computing device 150 in a vehicle V5, or as many vehicles as are approaching the intersection. The identical algorithm is performed by each copy of the avoidance program running on the computing device in each vehicle. In an embodiment, each copy of the avoidance program compares the results it calculated to the results received from the copy of the avoidance program running on the computing devices in the other vehicles, and only proceeds if the results are identical. In an embodiment, if the results are not identical, then the avoidance program in each vehicle notifies the driver to manually determine which vehicle should proceed first.

In an embodiment, avoidance program 112 running on computing device 110 in vehicle V1 receives VIV2 from avoidance program 122 running on computing device 120 in vehicle V2. In an embodiment, avoidance program 112 determines if the two vehicles are traveling on the same road and, if so, if they are traveling in the same direction. In an embodiment, if avoidance program 112 determines that the two vehicles are traveling on the same road and in the same direction, then V1 and V2 are candidates for a convoy, and avoidance program 112 then determines if the distance between V1 and V2 is less than a threshold distance. In an embodiment, if avoidance program 112 determines if the distance between V1 and V2 is less than a threshold distance, and either V1 or V2 or both are already part of a convoy, then avoidance program 112 determines whether V1 and V2 are the closest pair of vehicles. In an embodiment, avoidance program 112 determines if the convoy identification, Cid1, is equal to 0. In an embodiment, if Cid1≠0, then V1 is already part of a convoy, and avoidance program 112 absorbs V2 into Convoy1. In an embodiment, since V2 is being absorbed into Convoy1, avoidance program 112 determines if V1 is in front of V2. In an embodiment, if avoidance program 112 determines that V1 is in front of V2, then avoidance program 112 sets V2 as the last vehicle in Convoy1. In an embodiment, since V2 has been added to Convoy1, avoidance program 112 sets the convoy identification of V2, i.e., Cid2, to the identification of Convoy1 (i.e., V2 is now in Convoy1, so convoy identification of V2 is set to Convoy1). In an embodiment, avoidance program 112 sets the position of V2 to the next position in Convoy1. In an embodiment, avoidance program 112 sets CVI1=VIV2+ CVI2, where CVIx is a list of the vehicle information vectors VIV of all the vehicles that follow vehicle x in a convoy. In an embodiment, if avoidance program 112 determines that V1 is not in front of V2, then avoidance program 112 sets V2 as the first vehicle in Convoy1. In an embodiment, since V2 has been added to Convoy1, avoidance program 112 sets the identification of Convoy2 equal to the identification of Convoy1 (i.e., V2 is now in Convoy1, so its convoy identification is changed to Convoy1). In an embodiment, avoidance program 112 determines if Cid2=0. In an embodiment, if avoidance program 112 determines that Cid2=0, then V2 is not already part of a convoy, and avoidance program 112 builds a new Convoy1. In an embodiment, since V2 is being absorbed into Convoy1, avoidance program 112 determines if V1 is in front of V2. In an embodiment, if avoidance program 112 determines that V1 is in front of V2, then avoidance program 112 sets V1 as the first vehicle in Convoy1. In an embodiment, since avoidance program 112 is building a new Convoy1, avoidance program 112 creates a Cid1 for Convoy1. In an embodiment, avoidance program 112 sets the position of V1 to the first position in Convoy1, since it is the first vehicle in the newly created Convoy1. In an embodiment, since Convoy1 is newly created and V1 is the first vehicle in Convoy1, avoidance program 112 sets the convoy vector CVI1 to the vector for V2, since that vector represents all the vehicles behind V1. In an embodiment, if avoidance program 112 determines that V1 is not in front of V2, then avoidance program 112 sets V1 as the last vehicle in Convoy1. Since this is a new convoy, the only vehicles in Convoy1 are V1 and V2, and since V1 is not in front of V2, it is the last vehicle in Convoy1. In an embodiment, since avoidance program 112 is building a new Convoy1, avoidance program 112 creates a Cid1 for Convoy1. In an embodiment, avoidance program 112 sets the position of V1 to the last position in Convoy1, since it is the last vehicle in the newly created Convoy1. In an embodiment, since Convoy1 is newly created and V2 is the first vehicle in Convoy1, avoidance program 112 sets the convoy vector CVI2 to the vector for V1, since that vector represents all the vehicles behind V2 (i.e., only V1 since this is a new convoy). In an embodiment, if avoidance program 112 determines that Cid2≠0, then V2 is already part of a convoy, and since Convoy1 is empty, but Convoy2 is not empty, avoidance program 112 absorbs vehicle V1 into Convoy2. In an embodiment, since V2 is being absorbed into Convoy1, avoidance program 112 determines if V1 is in front of V2. In an embodiment, if avoidance program 112 determines that V1 is in front of V2, then avoidance program 112 sets V1 as the first vehicle in Convoy2. In an embodiment, since V1 has been added to Convoy2, avoidance program 112 sets the identification of Convoy1 equal to the identification of Convoy2 (i.e., V1 is now in Convoy2, so convoy identification of V1 is changed to Convoy2). In an embodiment, avoidance program 112 sets the position of V1 to the first position in Convoy2, i.e., avoidance program 112 decrements the current vehicle position of Convoy2 and assigns that position to V1. In an embodiment, since V1 is now the first vehicle in Convoy2, avoidance program 112 adds the vehicle vector information from V2, VIV2, to the convoy information vector of V1, CVI1, and concatenates to it the convoy information vector from V2, CVI2, if any is found. In an embodiment, if avoidance program 112 determines that V1 is not in front of V2, then avoidance program 112 sets V1 as the last vehicle in Convoy2, since the only vehicles in Convoy2 are V1 and V2, and V1 is behind V2. In an embodiment, since V1 has been added to Convoy2, avoidance program 112 sets the identification of Convoy1 equal to the identification of Convoy2 (i.e., V1 is now in Convoy2, so its convoy identification is changed to Convoy2). In an embodiment, avoidance program 112 sets the position of V1 to the next position in Convoy2, i.e., avoidance program 112 decrements the current vehicle position of Convoy2 and assigns that position to V1. In an embodiment, avoidance program 112 adds the vehicle vector information from V1, VIV1, to the convoy information vector of V2, CVI2, and concatenates to it the convoy information vector from V1, CVI1, if any is found. In an embodiment, avoidance program 112 builds NewVIV1 to pass the updated intersection crossing data (speed, etc.) to V1. In an embodiment, avoidance program 112 builds NewVIV2 to pass the updated intersection crossing data (speed, etc.) to V1. In an embodiment, avoidance program 112 sends NewVIV1 and NewVIV2 to both V1 and V2.

It should be appreciated that embodiments of the present invention provide at least for collaborative accident prevention. However, FIGS. 6a, 6b, and 6c provide only an illustration of one implementation and does not imply any limitations with regard to the environments in which different embodiments may be implemented. Many modifications to the depicted environment may be made by those skilled in the art without departing from the scope of the invention as recited by the claims.

Avoidance program 112 receives VIV2 from V2 (step 602). In an embodiment, avoidance program 112 running on computing device 110 in vehicle V1 receives VIV2 from avoidance program 122 running on computing device 120 in vehicle V2.

Avoidance program 112 determines if V1, V2 are on the same road and direction (decision block 604). In an embodiment, avoidance program 112 determines if the two vehicles are traveling on the same road and, if so, if they are traveling in the same direction. In an embodiment, avoidance program 112 determines if the two vehicles are traveling on the same road and in the same direction from the information in VIV1 and VIV2. If avoidance program 112 determines that the two vehicles are not traveling on the same road or not in the same direction ("no" branch, decision block 604), then V1 and V2 are not candidates for a convoy, and avoidance program 112 ends for this cycle.

Avoidance program 112 determines if the distance between V1 and V2 is less than a threshold (decision block 606). If avoidance program 112 determines that the two vehicles are traveling on the same road and in the same direction ("yes" branch, decision block 604), then V1 and V2 are candidates for a convoy, and avoidance program 112 next determines if the distance between V1 and V2 is less than a threshold distance. This threshold distance is the furthest distance between V1 and V2 to be considered safely within a convoy. In an embodiment, the threshold distance is a system default. In an embodiment, the user of the computing device running avoidance program 112 cannot change the threshold distance for safety reasons.

Avoidance program 112 determines if V1, V2 are the closest pair (decision block 608). In an embodiment, if avoidance program 112 determines if the distance between V1 and V2 is less than a threshold distance ("yes" branch, decision block 606), and either V1 or V2 or both are already part of a convoy, then avoidance program 112 determines whether V1 and V2 are the closest pair of vehicles. If either V1 or V2, or both, are already in a convoy, then V1 and V2 are the closest pair. In an embodiment, if avoidance program 112 determines that V1 and V2 are the closest pair of vehicles ("yes" branch, decision block 608), then avoidance program 112 proceeds to decision block 610. If avoidance program 112 determines that V1 and V2 are not the closest pair of vehicles, then avoidance program 112 chooses a different pair of vehicles and repeats decision block 608 until the closest pair is found.

In an embodiment, if one of the two vehicles V1 and V2, or both, are already in a convoy, the two vehicles that negotiate the merger are the two that are the closest to each other. For example, if V1 and V3 form a convoy C1 and V2 and V4 form a convoy C2, then V2 will negotiate its merger into C1 with V1 if the distance D(V1,V2) between them is the smallest of all permutations, in this case smaller than D(V1,V4) or D(V2,V3).

For the remainder of workflow 600, it is assumed that V1 and V2 are the closest pair. If another pair is determined to be the closest pair, substitute the two closest vehicles for V1 and V2 below.

In an embodiment, if avoidance program 112 determines that the distance between V1 and V2 is not less than a threshold distance ("no" branch, decision block 606), then avoidance program 112 ends for this cycle.

Avoidance program 112 determines if Cid1=0 (decision block 610). In an embodiment, avoidance program 112 determines if the convoy identification for convoy 1, Cid1, is equal to 0. In an embodiment, if avoidance program 112 determines that Cid1=0 ("yes" branch, decision block 610), then V1 is not already part of a convoy, and avoidance program 112 proceeds to decision block 632 to determine if V2 is already part of a convoy.

Avoidance program 112 Absorbs V2 into Convoy1 (step 612). In an embodiment, if avoidance program 112 determines that Cid1≠0 ("no" branch, decision block 610), then V1 is already part of a convoy, and avoidance program 112 absorbs V2 into Convoy1.

Avoidance program 112 determines if V1 is in front of V2 (decision block 614). In an embodiment, since V2 is being absorbed into Convoy1, avoidance program 112 determines if V1 is in front of V2. In an embodiment, if avoidance program 112 determines that V1 is not in front of V2 ("no" branch, decision block 614), then avoidance program 112 proceeds to step 624.

Avoidance program 112 sets V2 as the last vehicle in Convoy1 (step 616). In an embodiment, if avoidance program 112 determines that V1 is in front of V2 ("yes" branch, decision block 614), then avoidance program 112 sets V2 as the last vehicle in Convoy1.

Avoidance program 112 sets Cid2 to Cid1 (step 618). In an embodiment, since V2 has been added to Convoy1, avoidance program 112 sets the convoy identification of V2, i.e., Cid2, to the identification of Convoy1 (i.e., V2 is now in Convoy1, so convoy identification of V2 is set to Convoy1).

Avoidance program 112 sets Cpos2=Cpos1+1 (step 620). In an embodiment, avoidance program 112 sets the position of V2 to the next position in Convoy1, i.e., avoidance program 112 increments the current vehicle position of Convoy1 and assigns that position to V2.

Avoidance program 112 sets CVI1=VIV2+CVI2 (step 622). In an embodiment, avoidance program 112 sets CVI1=VIV2+CVI2, where CVIx is a list of the vehicle information vectors VIV of all the vehicles that follow vehicle x in a convoy. In an embodiment, avoidance program 112 adds the vehicle vector information from V2, VIV2, to the convoy information vector of V1, CVI1, and concatenates to it the convoy information vector from V2, CVI2, if any is found. In an embodiment, avoidance program 112 then proceeds to step 674.

Avoidance program 112 sets V2 as the first vehicle in Convoy1 (step 624). In an embodiment, if avoidance program 112 determines that V1 is not in front of V2 ("no" branch, decision block 614), then avoidance program 112 sets V2 as the first vehicle in Convoy1.

Avoidance program 112 sets Cid2 to Cid1 (step 626). In an embodiment, since V2 has been added to Convoy1, avoidance program 112 sets the identification of Convoy2 equal to the identification of Convoy1 (i.e., V2 is now in Convoy1, so its convoy identification is changed to Convoy1).

Avoidance program 112 sets Cpos2=Cpos1−1 (step 628). In an embodiment, avoidance program 112 sets the position of V2, Cpos2, to the previous position in Convoy1, i.e., avoidance program 112 decrements the current vehicle position of Convoy1 and assigns that position to V2.

Avoidance program 112 sets CVI2=VIV1+CVI1 (step 630). In an embodiment, avoidance program 112 adds the vehicle vector information from V1, VIV1, to the convoy information vector of V2, CVI2, and concatenates to it the convoy information vector from V1, CVI1, if any is found. In an embodiment, avoidance program 112 then proceeds to step 674.

Avoidance program 112 determines if Cid2=0 (decision block 632). In an embodiment, avoidance program 112 determines if Cid2=0. In an embodiment, if avoidance program 112 determines that Cid2≠0 ("no" branch, decision block 632), then V2 is already part of a convoy, and avoidance program 112 proceeds to decision block 654.

Avoidance program 112 builds new Convoy1 (step 634). In an embodiment, if avoidance program 112 determines that Cid2=0 ("yes" branch, decision block 632), then neither V1 nor V2 is already part of a convoy, and avoidance program 112 builds a new Convoy1.

Avoidance program 112 determines if V1 is in front of V2 (decision block 636). In an embodiment, since V2 is being absorbed into Convoy1, avoidance program 112 determines if V1 is in front of V2. In an embodiment, if avoidance program 112 determines that V1 is not in front of V2 ("no" branch, decision block 636), then avoidance program 112 proceeds to step 646.

Avoidance program 112 sets V1 as the first vehicle in Convoy1 (step 638). In an embodiment, if avoidance program 112 determines that V1 is in front of V2 ("yes" branch, decision block 636), then avoidance program 112 sets V1 as the first vehicle in Convoy1.

Avoidance program 112 creates Cid1 (step 640). In an embodiment, since avoidance program 112 is building a new Convoy1, avoidance program 112 creates a convoy identification Cid1 for Convoy1.

Avoidance program 112 sets Cpos1=1 (step 642). In an embodiment, avoidance program 112 sets the position of V1 to the first position in Convoy1, since it is the first vehicle in the newly created Convoy1.

Avoidance program 112 sets CVI1=VIV2 (step 644). In an embodiment, since Convoy1 is newly created and V1 is the first vehicle in Convoy1, avoidance program 112 sets the convoy vector CVI1 to the vector for V2, since that vector represents all the vehicles behind V1 (i.e., only V2 since this is a new convoy). In an embodiment, avoidance program 112 then proceeds to step 674.

Avoidance program 112 sets V1 as the last vehicle in Convoy1 (step 646). In an embodiment, if avoidance program 112 determines that V1 is not in front of V2 ("no" branch, decision block 636), then avoidance program 112 sets V1 as the last vehicle in Convoy1. Since this is a new convoy, the only vehicles in Convoy1 are V1 and V2, and since V1 is not in front of V2, it is the last vehicle in Convoy1.

Avoidance program 112 creates Cid1 (step 648). In an embodiment, since avoidance program 112 is building a new Convoy1, avoidance program 112 creates a convoy identification Cid1 for Convoy1.

Avoidance program 112 sets Cpos1=2 (step 650). In an embodiment, avoidance program 112 sets the position of V1 to the last position in Convoy1, since it is the last vehicle in the newly created Convoy1.

Avoidance program 112 sets CVI2=VIV1 (step 652). In an embodiment, since Convoy1 is newly created and V2 is the first vehicle in Convoy1, avoidance program 112 sets the convoy vector CVI2 to the vector for V1, since that vector represents all the vehicles behind V2 (i.e., only V1 since this is a new convoy). In an embodiment, avoidance program 112 then proceeds to step 674.

Avoidance program 112 absorbs V1 into Convoy2 (decision block 654). In an embodiment, if avoidance program 112 determines that Cid2≠0 ("no" branch, decision block 632), then V2 is already part of a convoy, and since Convoy1 is empty, but Convoy2 is not empty, avoidance program 112 absorbs vehicle V1 into Convoy2.

Avoidance program 112 determines if V1 is in front of V2 (decision block 656). In an embodiment, since V2 is being absorbed into Convoy1, avoidance program 112 determines if V1 is in front of V2. In an embodiment, if avoidance program 112 determines that V1 is not in front of V2 ("no" branch, decision block 656), then avoidance program 112 proceeds to step 666.

Avoidance program 112 sets V1 as the first vehicle in Convoy2 (step 658). In an embodiment, if avoidance program 112 determines that V1 is in front of V2 ("yes" branch, decision block 656), then avoidance program 112 sets V1 as the first vehicle in Convoy2.

Avoidance program 112 sets Cid1 to Cid2 (step 660). In an embodiment, since V1 has been added to Convoy2, avoidance program 112 sets the identification of Convoy1 equal to the identification of Convoy2 (i.e., V1 is now in Convoy2, so convoy identification of V1 is changed to Convoy2).

Avoidance program 112 sets Cpos1=Cpos2−1 (step 662). In an embodiment, avoidance program 112 sets the position of V1 to the first position in Convoy2, i.e., avoidance program 112 decrements the current vehicle position of Convoy2 and assigns that position to V1.

Avoidance program 112 sets CVI1=VIV2+CVI2 (step 664). In an embodiment, since V1 is now the first vehicle in Convoy2, avoidance program 112 adds the vehicle vector information from V2, VIV2, to the convoy information vector of V1, CVI1, and concatenates to it the convoy information vector from V2, CVI2, if any is found. In an embodiment, avoidance program 112 then proceeds to step 674.

Avoidance program 112 sets V1 as the last vehicle in Convoy2 (step 666). In an embodiment, if avoidance program 112 determines that V1 is not in front of V2 ("no" branch, decision block 656), then avoidance program 112 sets V1 as the last vehicle in Convoy2, since Convoy2 absorbs V1, and V1 is behind V2.

Avoidance program 112 sets Cid1 to Cid2 (step 668). In an embodiment, since V1 has been added to Convoy2, avoidance program 112 sets the identification of Convoy1 equal to the identification of Convoy2 (i.e., V1 is now in Convoy2, so its convoy identification is changed to Convoy2).

Avoidance program 112 sets Cpos1=Cpos2+1 (step 670). In an embodiment, avoidance program 112 sets the position of V1 to the next position in Convoy2, i.e., avoidance program 112 increments the current vehicle position of Convoy2 and assigns that position to V1.

Avoidance program 112 sets CVI2=VIV1+CVI1 (step 672). In an embodiment, avoidance program 112 adds the vehicle vector information from V1, VIV1, to the convoy information vector of V2, CVI2, and concatenates to it the convoy information vector from V1, CVI1, if any is found.

Avoidance program 112 builds a new VIV1 (step 674). In an embodiment, avoidance program 112 builds NewVIV1 to pass the updated intersection crossing data (speed, etc.) to V1. In an embodiment, the NewVIV1 is based on the data from the original VIV1 and the CVI of the convoy of which V1 is now a member.

Avoidance program 112 builds a new VIV2 (step 676). In an embodiment, avoidance program 112 builds NewVIV2 to pass the updated intersection crossing data (speed, etc.) to V1. In an embodiment, the NewVIV2 is based on the data from the original VIV2 and the CVI of the convoy of which V2 is now a member.

Avoidance program 112 sends NewVIV1 and NewVIV2 (step 678). In an embodiment, avoidance program 112 sends NewVIV1 and NewVIV2 to both V1 and V2. Avoidance program 112 then updates the driver of each vehicle to the new speed and crossing information. Note—if there are more vehicles to be added to the convoy, the above repeats for each vehicle in the convoy.

Figure 7:
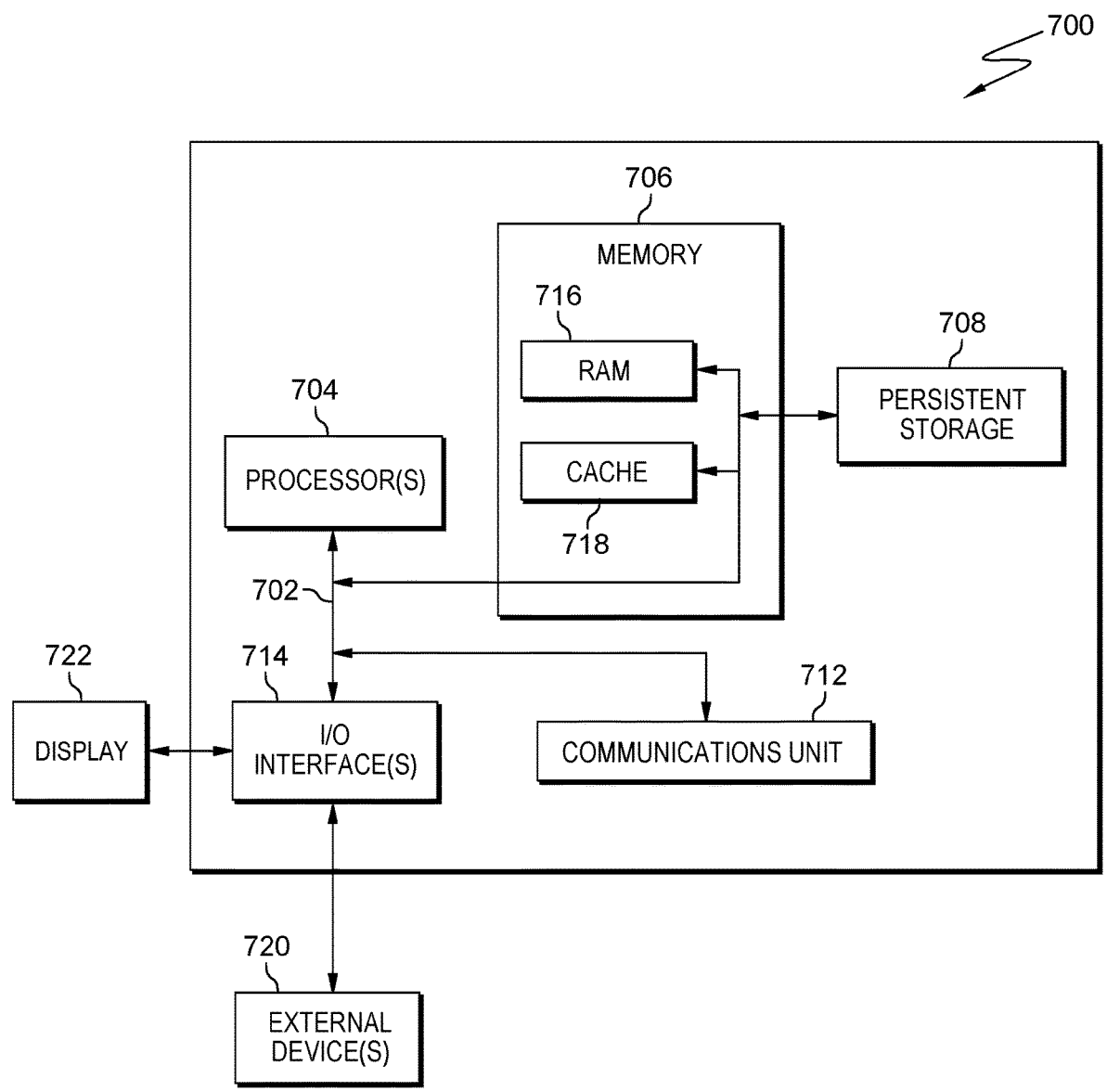
FIG. 7 depicts a block diagram of components of the computing devices executing the avoidance program within the distributed data processing environment of FIG. 1, in accordance with an embodiment of the present invention

FIG. 7 is a block diagram depicting components of computing devices 110, 120, 130, 140, and 150, suitable for avoidance program 112, in accordance with at least one embodiment of the invention. FIG. 7 displays the computer 700, one or more processor(s) 704 (including one or more computer processors), a communications fabric 702, a memory 706 including, a random-access memory (RAM) 716, and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and input/output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and near recently accessed data, from RAM 716.

Program instructions for avoidance program 112 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., avoidance program 112, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for collaborative accident prevention, the computer-implemented method comprising:

receiving, by one or more computer processors, a first vehicle information vector associated with a first trajectory of a first vehicle approaching an intersection, wherein the first vehicle information vector contains at least a first vehicle speed, a first vehicle position, and a first vehicle direction;

receiving, by the one or more computer processors, a second vehicle information vector associated with a second trajectory of a second vehicle also approaching the intersection, wherein the second vehicle information vector contains at least a second vehicle speed, a second vehicle position, and a second vehicle direction;

calculating, by the one or more processors, a projected arrival time at which each of the first vehicle and the second vehicle enters the intersection based on the first vehicle information vector and the second vehicle information vector;

adding, by the one or more processors, a safety factor to the projected arrival time and determining if the second vehicle reaches the intersection after a projected exit time of the first vehicle plus the safety factor;

responsive to the second vehicle reaching the intersection before the first vehicle has left the intersection plus the safety factor, determining, by the one or more processors, that a collision is possible and calculating a priority to cross the intersection of the first vehicle and a priority to cross the intersection of the second vehicle;

responsive to the priority of the first vehicle being the same as the priority of the second vehicle, calculating, by the one or more processors, a first adjusted vehicle speed for the first vehicle and a second adjusted vehicle speed for the second vehicle to avoid the collision;

calculating, by the one or more processors, a first combined cost of energy consumption, carbon footprint, and traffic flow for the first adjusted vehicle speed and a second combined cost of energy consumption, carbon footprint, and traffic flow for the second adjusted vehicle speed; and based on the first combined cost for the first vehicle being larger than the second combined cost for the second vehicle, displaying, by the one or more processors, a message on a dashboard of the first vehicle to prompt a first driver of the first vehicle to change the first vehicle speed to the first adjusted vehicle speed.

2. The computer-implemented method of claim 1, wherein the first vehicle information vector from the first vehicle and the second vehicle information vector from the second vehicle further comprises at least one of:
 a vehicle identifier;
 a vehicle priority;
 a vehicle route data, wherein the vehicle route data includes at least one of a route identifier, a route direction, and global positioning system coordinates of a route;
 a vehicle crossing data, wherein the vehicle crossing data is zero if a vehicle is not approaching the intersection;
 a vehicle crossing time interval, wherein the vehicle crossing time interval further comprises a projected arrival time at the intersection associated with each vehicle, a projected exit time at the intersection associated with each vehicle, and the safety factor at the intersection; and
 a vehicle dynamic data, wherein the vehicle dynamic data further comprises at least one of a vehicle current speed, a vehicle lower possible speeds, a vehicle energy consumption, and a vehicle carbon footprint.

3. The computer-implemented method of claim 2 further comprising:
 comparing, by the one or more computer processors, a first vehicle priority of the first vehicle to a second vehicle priority of the second vehicle to determine a lower priority vehicle and a higher priority vehicle; and
 responsive to determining that the first vehicle priority is not equal to the second vehicle priority, adjusting, by the one or more computer processors, a vehicle speed of the lower priority vehicle to allow the higher priority vehicle to cross the intersection first.

4. The computer-implemented method of claim 2 further comprising:
 calculating, by the one or more computer processors, from the vehicle dynamic data of the first vehicle and the second vehicle, a first combined vehicle efficiency, wherein the first combined vehicle efficiency is calculated based on the first vehicle crossing the intersection first and a second combined vehicle efficiency, wherein the second combined vehicle efficiency is calculated based on the second vehicle crossing the intersection first;
 comparing, by the one or more computer processors, the first combined vehicle efficiency to the second combined vehicle efficiency to determine a lower efficiency vehicle crossing sequence and a higher efficiency vehicle crossing sequence; and
 responsive to determining the higher efficiency vehicle crossing sequence, adjusting, by the one or more computer processors, a vehicle speed of the vehicle crossing the intersection second according to the higher efficiency vehicle crossing sequence to allow an other vehicle to cross the intersection first.

5. The computer-implemented method of claim 1, wherein responsive to receiving the second vehicle information vector from the second vehicle, calculating the optimal order to cross the intersection based on the first vehicle information and the second vehicle information further comprises:
 calculating, by the one or more computer processors, a first total time to clear the intersection if the first vehicle crosses the intersection first;
 calculating, by the one or more computer processors, a second total time to clear the intersection if the second vehicle crosses the intersection first; and
 responsive to determining that the first total time to clear the intersection is not equal to the second total time to clear the intersection, determining, by the one or more computer processors, the optimal order to cross the intersection based on the first total time to clear the intersection and the second total time to clear the intersection.

6. A computer program product for collaborative accident prevention, the computer program product comprising:
 one or more computer readable storage devices and program instructions stored on the one or more computer readable storage devices, the program instructions including instructions to:
 determine, by one or more computer processors, a first vehicle information vector associated with a first trajectory of a first vehicle approaching an intersection, wherein the first vehicle information vector contains at least a first vehicle speed, a first vehicle position, and a first vehicle direction;
 determine, by the one or more computer processors, a second vehicle information vector associated with a second trajectory of a second vehicle also approaching the intersection, wherein the second vehicle information vector contains at least a second vehicle speed, a second vehicle position, and a second vehicle direction;
 calculate, by the one or more processors, a projected arrival time at which each of the first vehicle and the second vehicle enters the intersection based on the first vehicle information vector and the second vehicle information vector;
 add, by the one or more processors, a safety factor to the projected arrival time and determining if the second vehicle reaches the intersection after a projected exit time of the first vehicle plus the safety factor;
 responsive to the second vehicle reaching the intersection before the first vehicle has left the intersection plus the safety factor, determine, by the one or more processors, that a collision is possible and calculating a priority to cross the intersection of the first vehicle and a priority to cross the intersection of the second vehicle;
 responsive to the priority of the first vehicle being the same as the priority of the second vehicle, calculate, by the one or more processors, a first adjusted vehicle speed for the first vehicle and a second adjusted vehicle speed for the second vehicle to avoid the collision;
 calculate, by the one or more processors, a first combined cost of energy consumption, carbon footprint, and traffic flow for the first adjusted vehicle speed and a second combined cost of energy consumption, carbon footprint, and traffic flow for the second adjusted vehicle speed; and
 based on the first combined cost for the first vehicle being larger than the second combined cost for the second vehicle, display, by the one or more processors, a message on a dashboard of the first vehicle to prompt a first driver of the first vehicle to change the first vehicle speed to the first adjusted vehicle speed.

7. The computer program product of claim 6, wherein the first vehicle information vector from the first vehicle and the second vehicle information vector from the second vehicle further comprises at least one of:
   a vehicle identifier;
   a vehicle priority;
   a vehicle route data, wherein the vehicle route data includes at least one of a route identifier, a route direction, and global positioning system coordinates of a route;
   a vehicle crossing data, wherein the vehicle crossing data is zero if a vehicle is not approaching the intersection;
   a vehicle crossing time interval, wherein the vehicle crossing time interval further comprises a projected arrival time at the intersection associated with each vehicle, a projected exit time at the intersection associated with each vehicle, and the safety factor at the intersection; and
   a vehicle dynamic data, wherein the vehicle dynamic data further comprises at least one of a vehicle current speed, a vehicle lower possible speeds, a vehicle energy consumption, and a vehicle carbon footprint.

8. The computer program product of claim 7, further comprising one or more of the following program instructions, stored on the one or more computer readable storage media, to:
   compare a first vehicle priority of the first vehicle to a second vehicle priority of the second vehicle to determine a lower priority vehicle and a higher priority vehicle; and
   responsive to determining that the first vehicle priority is not equal to the second vehicle priority, adjust a vehicle speed of the lower priority vehicle to allow the higher priority vehicle to cross the intersection first.

9. The computer program product of claim 7 further comprising one or more of the following program instructions, stored on the one or more computer readable storage media, to:
   calculate from the vehicle dynamic data of the first vehicle and the second vehicle, a first combined vehicle efficiency, wherein the first combined vehicle efficiency is calculated based on the first vehicle crossing the intersection first and a second combined vehicle efficiency, wherein the second combined vehicle efficiency is calculated based on the second vehicle crossing the intersection first;
   compare the first combined vehicle efficiency to the second combined vehicle efficiency to determine a lower efficiency vehicle crossing sequence and a higher efficiency vehicle crossing sequence; and
   responsive to determining the higher efficiency vehicle crossing sequence, adjust a vehicle speed of the vehicle crossing the intersection in second according to the higher efficiency vehicle crossing sequence to allow another vehicle to cross the intersection first.

10. The computer program product of claim 6, wherein responsive to receiving the second vehicle information vector from the second vehicle, calculating the optimal order to cross the intersection based on the first vehicle information and the second vehicle information further comprises one or more of the following program instructions, stored on the one or more computer readable storage media, to:

calculate a first total time to clear the intersection if the first vehicle crosses the intersection first;
calculate a second total time to clear the intersection if the second vehicle crosses the intersection first; and
responsive to determining that the first total time to clear the intersection is not equal to the second total time to clear the intersection, determine the optimal order to cross the intersection based on the first total time to clear the intersection and the second total time to clear the intersection.

11. A computer system for collaborative accident prevention, the computer system comprising:
   one or more computer processors;
   one or more computer readable storage media; and
   program instructions stored on the one or more computer readable storage media for execution by at least one of the one or more computer processors, the computer program instructions including instructions to:
   determine, by one or more computer processors, a first vehicle information vector associated with a first trajectory of a first vehicle approaching an intersection, wherein the first vehicle information vector contains at least a first vehicle speed, a first vehicle position, and a first vehicle direction;
   determine, by the one or more computer processors, a second vehicle information vector associated with a second trajectory of a second vehicle also approaching the intersection, wherein the second vehicle information vector contains at least a second vehicle speed, a second vehicle position, and a second vehicle direction;
   calculate, by the one or more processors, a projected arrival time at which each of the first vehicle and the second vehicle enters the intersection based on the first vehicle information vector and the second vehicle information vector;
   add, by the one or more processors, a safety factor to the projected arrival time and determining if the second vehicle reaches the intersection after a projected exit time of the first vehicle plus the safety factor;
   responsive to the second vehicle reaching the intersection before the first vehicle has left the intersection plus the safety factor, determine, by the one or more processors, that a collision is possible and calculating a priority to cross the intersection of the first vehicle and a priority to cross the intersection of the second vehicle;
   responsive to the priority of the first vehicle being the same as the priority of the second vehicle, calculate, by the one or more processors, a first adjusted vehicle speed for the first vehicle and a second adjusted vehicle speed for the second vehicle to avoid the collision;
   calculate, by the one or more processors, a first combined cost of energy consumption, carbon footprint, and traffic flow for the first adjusted vehicle speed and a second combined cost of energy consumption, carbon footprint, and traffic flow for the second adjusted vehicle speed; and
   based on the first combined cost for the first vehicle being larger than the second combined cost for the second vehicle, display, by the one or more processors, a message on a dashboard of the first vehicle to prompt a first driver of the first vehicle to change the first vehicle speed to the first adjusted vehicle speed.

12. The computer system of claim 11, wherein the first vehicle information vector from the first vehicle and the second vehicle information vector from the second vehicle further comprises at least one of:
   a vehicle identifier;

a vehicle priority;
a vehicle route data, wherein the vehicle route data includes at least one of a route identifier, a route direction, and global positioning system coordinates of a route;
a vehicle crossing data, wherein the vehicle crossing data is zero if a vehicle is not approaching the intersection;
a vehicle crossing time interval, wherein the vehicle crossing time interval further comprises a projected arrival time at the intersection associated with each vehicle, a projected exit time at the intersection associated with each vehicle, and the safety factor at the intersection; and
a vehicle dynamic data, wherein the vehicle dynamic data further comprises at least one of a vehicle current speed, a vehicle lower possible speeds, a vehicle energy consumption, and a vehicle carbon footprint.

13. The computer system of claim 12 further comprising one or more of the following program instructions, stored on the one or more computer readable storage media, to:
compare a first vehicle priority of the first vehicle to a second vehicle priority of the second vehicle to determine a lower priority vehicle and a higher priority vehicle; and
responsive to determining that the first vehicle priority is not equal to the second vehicle priority, adjust a vehicle speed of the lower priority vehicle to allow the higher priority vehicle to cross the intersection first.

14. The computer system of claim 12 further comprising one or more of the following program instructions, stored on the one or more computer readable storage media, to:
calculate from the vehicle dynamic data of the first vehicle and the second vehicle, a first combined vehicle efficiency, wherein the first combined vehicle efficiency is calculated based on the first vehicle crossing the intersection first and a second combined vehicle efficiency, wherein the second combined vehicle efficiency is calculated based on the second vehicle crossing the intersection first;
compare the first combined vehicle efficiency to the second combined vehicle efficiency to determine a lower efficiency vehicle crossing sequence and a higher efficiency vehicle crossing sequence; and
responsive to determining the higher efficiency vehicle crossing sequence, adjust a vehicle speed of the vehicle crossing the intersection in second according to the higher efficiency vehicle crossing sequence to allow another vehicle to cross the intersection first.

15. The computer system of claim 11, wherein responsive to receiving the second vehicle information vector from the second vehicle, calculating the optimal order to cross the intersection based on the first vehicle information and the second vehicle information further comprises one or more of the following program instructions, stored on the one or more computer readable storage media, to:
calculate a first total time to clear the intersection if the first vehicle crosses the intersection first;
calculate a second total time to clear the intersection if the second vehicle crosses the intersection first; and
responsive to determining that the first total time to clear the intersection is not equal to the second total time to clear the intersection, determine the optimal order to cross the intersection based on the first total time to clear the intersection and the second total time to clear the intersection.

16. A computer-implemented method for collaborative accident prevention, the computer-implemented method comprising:
determining, by one or more computer processors, a first vehicle information vector associated with a first trajectory of a first vehicle approaching an intersection, wherein the first vehicle information vector from the first vehicle contains one or more first vehicle information, including at least a first vehicle speed, a first vehicle position, and a first vehicle direction;
determining, by the one or more computer processors, a second vehicle information vector associated with a second trajectory of a second vehicle also approaching the intersection, wherein the second vehicle information vector from the second vehicle contains one or more second vehicle information, including at least a second vehicle speed, a second vehicle position, and a second vehicle direction;
determining, by the one or more computer processors, whether a distance between the first vehicle and the second vehicle is less than a threshold;
responsive to determining that the distance between the first vehicle and the second vehicle is less than the threshold, adding, by the one or more computer processors, the first vehicle and the second vehicle to a convoy including a plurality of convoy vehicles approaching the intersection;
determining, by the one or more computer processors, a first convoy vehicle of the plurality of convoy vehicles, wherein the first convoy vehicle is a front vehicle of the plurality of convoy vehicles;
calculating, by the one or more processors, a projected arrival time at which each of the first convoy vehicle and the second convoy vehicle enters the intersection based on the first vehicle information vector and the second vehicle information vector;
adding, by the one or more processors, a safety factor to the projected arrival time and determining if the second convoy vehicle reaches the intersection after a projected exit time of the first convoy vehicle plus the safety factor;
responsive to the second convoy vehicle reaching the intersection before the first convoy vehicle has left the intersection plus the safety factor, determining, by the one or more processors, that a collision is possible and calculating a priority of the first convoy vehicle to cross the intersection and a priority of the second convoy vehicle to cross the intersection;
responsive to the priority of the first convoy vehicle being the same as the priority of the second convoy vehicle, calculating, by the one or more processors, a first adjusted vehicle speed for the first convoy vehicle and a second adjusted vehicle speed for the second convoy vehicle to avoid the collision;
calculating, by the one or more processors, a first combined cost of energy consumption, carbon footprint, and traffic flow for the first adjusted vehicle speed and a second combined cost of energy consumption, carbon footprint, and traffic flow for the second adjusted vehicle speed; and
based on the first combined cost for the first convoy vehicle being larger than the second combined cost for the second convoy vehicle, displaying, by the one or more processors, a message on a dashboard of the first convoy vehicle to prompt a first driver of the first convoy vehicle to change the first convoy vehicle speed to the first adjusted vehicle speed.

17. The computer-implemented method of claim 16, wherein the first vehicle information vector from the first vehicle and the second vehicle information vector from the second vehicle further comprises at least one of:
- a vehicle identifier;
- a vehicle priority;
- a vehicle route data, wherein the vehicle route data includes at least one of a route identifier, a route direction, and global positioning system coordinates of a route;
- a vehicle crossing data, wherein the vehicle crossing data is zero if a vehicle is not approaching the intersection;
- a vehicle crossing time interval, wherein the vehicle crossing time interval further comprises a projected arrival time at the intersection associated with each vehicle, a projected exit time at the intersection associated with each vehicle, and the safety factor at the intersection; and
- a vehicle dynamic data, wherein the vehicle dynamic data further comprises at least one of a vehicle current speed, a vehicle lower possible speeds, a vehicle energy consumption, and a vehicle carbon footprint.

18. The computer-implemented method of claim 16, wherein broadcasting the convoy information vector further comprises:
- retrieving, by the one or more computer processors, a third vehicle information vector for each convoy vehicle of the plurality of convoy vehicles;
- adding, by the one or more computer processors, the third vehicle information vector for convoy vehicle of the plurality of convoy vehicles to the convoy information vector;
- adding, by the one or more computer processors, the convoy information vector to a vehicle information vector of the first convoy vehicle; and
- broadcasting the vehicle information vector of the first convoy vehicle.

19. The computer-implemented method of claim 16, further comprising:
- responsive to determining that the first vehicle is already a member of a first existing convoy, adding, by the one or more computer processors, the second vehicle to the first existing convoy; and
- responsive to determining that the first vehicle is not the member of a first existing convoy and that the second vehicle is a member of a second existing convoy, adding, by the one or more computer processors, the first vehicle to the second existing convoy.

20. The computer-implemented method of claim 16, further comprising a maximum convoy size, wherein the maximum convoy size is a system default.

21. A computer-implemented method for collaborative accident prevention, the computer-implemented method comprising:
- determining, by one or more computer processors, a first vehicle information vector associated with a first trajectory of a first vehicle approaching an intersection, wherein the first vehicle information vector from the first vehicle contains one or more first vehicle information, including at least a first vehicle speed, a first vehicle position, and a first vehicle direction;
- determining, by the one or more computer processors, a second vehicle information vector associated with a second trajectory of a second vehicle also approaching the intersection, wherein the second vehicle information vector from the second vehicle contains one or more second vehicle information, including at least a second vehicle speed, a second vehicle position, and a second vehicle direction;
- calculating, by the one or more processors, a projected arrival time at which each of the first vehicle and the second vehicle enters the intersection based on the first vehicle information vector and the second vehicle information vector;
- adding, by the one or more processors, a safety factor to the projected arrival time and determining if the second vehicle reaches the intersection after a projected exit time of the first vehicle plus the safety factor;
- responsive to the second vehicle reaching the intersection before the first vehicle has left the intersection plus the safety factor, determining, by the one or more processors, that a collision is possible and calculating a priority of the first vehicle to cross the intersection and a priority of the second vehicle to cross the intersection;
- responsive to the priority of the first vehicle being higher than the priority of the second vehicle, calculating, by the one or more processors, a second adjusted vehicle speed for the second vehicle to avoid the collision; and
- displaying, by the one or more processors, a message on a dashboard of the second vehicle to prompt a second driver of the second vehicle to change the second vehicle speed to the second adjusted vehicle speed.

22. The computer-implemented method of claim 21, wherein displaying the message on the dashboard of the second vehicle to prompt the second driver further comprises signaling, by the one or more computer processors, the second driver of the second vehicle when the second vehicle is a next vehicle to cross the intersection.

23. The computer-implemented method of claim 21, wherein the first vehicle information vector from the first vehicle and the second vehicle information vector from the second vehicle further comprises at least one of:
- a vehicle identifier;
- a vehicle priority;
- a vehicle route data, wherein the vehicle route data includes at least one of a route identifier, a route direction, and global positioning system coordinates of a route;
- a vehicle crossing data, wherein the vehicle crossing data is zero if a vehicle is not approaching the intersection;
- a vehicle crossing time interval, wherein the vehicle crossing time interval further comprises a projected arrival time at the intersection associated with each vehicle, a projected exit time at the intersection associated with each vehicle, and the safety factor at the intersection; and
- a vehicle dynamic data, wherein the vehicle dynamic data further comprises at least one of a vehicle current speed, a vehicle lower possible speeds, a vehicle energy consumption, and a vehicle carbon footprint.

24. The computer-implemented method of claim 23 further comprising:
- comparing, by the one or more computer processors, a vehicle priority of the first vehicle to a vehicle priority of the second vehicle to determine a lower priority vehicle and a higher priority vehicle; and
- responsive to determining that the vehicle priority of the first vehicle is not equal to the vehicle priority of the second vehicle, adjusting, by the one or more computer processors, a vehicle speed of the lower priority vehicle to allow the higher priority vehicle to cross the intersection first.

25. The computer-implemented method of claim 23 further comprising:
- calculating, by the one or more computer processors, from the vehicle dynamic data of the first vehicle and the second vehicle, a first combined vehicle efficiency, wherein the first combined vehicle efficiency is calculated based on the first vehicle crossing the intersection first and a second combined vehicle efficiency, wherein the second combined vehicle efficiency is calculated based on the second vehicle crossing the intersection first;
- comparing, by the one or more computer processors, the first combined vehicle efficiency to the second combined vehicle efficiency to determine a lower efficiency vehicle crossing sequence and a higher efficiency vehicle crossing sequence; and
- responsive to determining the higher efficiency vehicle crossing sequence, adjusting, by the one or more computer processors, a vehicle speed of the vehicle crossing the intersection in second according to the higher efficiency vehicle crossing sequence to allow an other vehicle to cross the intersection first.

* * * * *